United States Patent
Ban et al.

(10) Patent No.: US 10,930,928 B2
(45) Date of Patent: Feb. 23, 2021

(54) MAGNESIUM METAL DEVICES AND METHODS OF MAKING THE SAME

(71) Applicant: Alliance for Sustainable Energy, LLC, Golden, CO (US)

(72) Inventors: Chunmei Ban, Golden, CO (US); Seoung-Bum Son, Wheat Ridge, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 117 days.

(21) Appl. No.: 15/735,352

(22) PCT Filed: Jun. 22, 2016

(86) PCT No.: PCT/US2016/038793
§ 371 (c)(1),
(2) Date: Dec. 11, 2017

(87) PCT Pub. No.: WO2016/209983
PCT Pub. Date: Dec. 29, 2016

(65) Prior Publication Data
US 2018/0190981 A1     Jul. 5, 2018

Related U.S. Application Data

(60) Provisional application No. 62/182,978, filed on Jun. 22, 2015.

(51) Int. Cl.
*H01M 4/46*     (2006.01)
*H01M 10/054*  (2010.01)
(Continued)

(52) U.S. Cl.
CPC .......... *H01M 4/466* (2013.01); *H01M 4/134* (2013.01); *H01M 4/381* (2013.01); *H01M 4/485* (2013.01);
(Continued)

(58) Field of Classification Search
None
See application file for complete search history.

(56) References Cited

U.S. PATENT DOCUMENTS 3,343,995 A * 9/1967 Reid ................. H01M 6/48
427/122
8,211,578 B2 * 7/2012 Jiang ................ H01M 4/5815
252/62.2

(Continued)

FOREIGN PATENT DOCUMENTS

WO    WO 2011/029058 A2    3/2011

OTHER PUBLICATIONS

Aurbach, D. et al., "Magnesium Deposition and Dissolution Processes in Ethereal Grignard Salt Solutions Using Simultaneous EQCM-EIS and In Situ FTIR Spectroscopy," Electrochemical and Solid-State Letters, vol. 3, No. 1, 2000, pp. 31-34.
(Continued)

*Primary Examiner* — Zhongqing Wei
(74) *Attorney, Agent, or Firm* — Michael A. McIntyre

(57) ABSTRACT

The present disclosure relates to a device that includes a first electrode, where the first electrode includes magnesium metal having a first surface, and a first coating in physical contact with the first surface and covering substantially all of the first surface, where the first coating has a first thickness, and the first coating is configured to transport a plurality of magnesium ions through the first thickness, such that a first portion of the plurality of magnesium ions are reversibly depositable as elemental magnesium onto the first surface.

16 Claims, 18 Drawing Sheets

(51) Int. Cl.
| | |
|---|---|
| H01M 10/0562 | (2010.01) |
| H01M 4/38 | (2006.01) |
| H01M 4/485 | (2010.01) |
| H01M 4/62 | (2006.01) |
| H01M 10/0568 | (2010.01) |
| H01M 10/0569 | (2010.01) |
| H01M 4/134 | (2010.01) |

(52) U.S. Cl.
CPC ............ *H01M 4/62* (2013.01); *H01M 4/622* (2013.01); *H01M 10/054* (2013.01); *H01M 10/0562* (2013.01); *H01M 10/0568* (2013.01); *H01M 10/0569* (2013.01); *H01M 2300/0065* (2013.01)

(56) References Cited

U.S. PATENT DOCUMENTS

| | | | | |
|---|---|---|---|---|
| 8,361,661 | B2* | 1/2013 | Doe | H01M 4/13 429/218.1 |
| 2010/0129719 | A1* | 5/2010 | Ito | H01M 4/0404 429/232 |
| 2011/0311880 | A1* | 12/2011 | Matsui | H01M 4/466 429/304 |
| 2012/0059129 | A1* | 3/2012 | He | C08F 8/34 525/344 |
| 2012/0315466 | A1 | 12/2012 | Abrami et al. | |
| 2014/0205904 | A1 | 7/2014 | Sasaki | |
| 2015/0010832 | A1 | 1/2015 | Kumta et al. | |
| 2015/0050554 | A1 | 2/2015 | Fukumine et al. | |
| 2015/0086876 | A1* | 3/2015 | Taeda | H01M 10/0525 429/332 |

OTHER PUBLICATIONS

Aurbach, D. et al., "Prototype systems for rechargeable magnesium batteries," Letters to Nature, vol. 407, Oct. 12, 2000, pp. 724-727.
Aurbach, D. et al., "Nonaqueous Magnesium Electrochemistry and Its Application in Secondary Batteries," Chemical Record, vol. 3, 2003, pp. 61-73.
Aurbach, D. et al., "Progress in Rechargeable Magnesium Battery Technology," Advanced Materials, vol. 19, 2007, pp. 4260-4267.
Chusid, O. et al., "Solid-State Rechargeable Magnesium Batteries," Advanced Materials, vol. 15, No. 7-8, 2003, pp. 627-630.
Connor, J. et al., "Electrodeposition of Metals from Organic Solutions," Journal of the Electrochemical Society, vol. 104, No. 1, 1957, pp. 38-41.
Gershinsky, G. et al., "Electrochemical and Spectroscopic Analysis of $Mg^{2+}$ Intercalation into Thin Film Electrodes of Layered Oxides: $V_2O_5$ and $MoO_3$," American Chemical Society, Langmuir, vol. 29, 2013, pp. 10964-10972.
Glushenkov, A. et al., "Growth of $V_2O_5$ nanorods from ball-milled powders and their performance in cathodes and anodes of lithium-ion batteries," Journal of Solid State Electrochem, vol. 14, 2010, pp. 1841-1846.
Ha, S. et al., "Magnesium(II) Bis(trifluoromethane solfonyl) Imide-Based Electrolytes with Wide Electrochemical Windows for Rechargeable Magnesium Batteries," Applied Materials & Interfaces, vol. 6, 2014, 4063-4073.
Liebenow, C. et al., "The electrodeposition of magnesium using solutions of organomagnesium halides, aminomagnesium halides and magnesium organoborates," Electrochemistry Communications, vol. 2, 2000, pp. 641-645.
Liu, T. et al., "A facile approach using $MgCl_2$ to formulate high performance $Mg^{2+}$ electrolytes for rechargeable Mg batteries," Journal of Materials Chemistry A, vol. 2, 2014, pp. 3430-3438.
Lu, Z. et al., "On the electrochemical behavior of magnesium electrodes in polar aprotic electrolyte solutions," Journal of Electroanalytical Chemistry, vol. 466, 1999, pp. 203-217.
Mizrahi, O. et al., "Electrolyte Solutions with a Wide Electrochemical Window for Rechargeable Magnesium Batteries," Journal of the Electrochemical Society, vol. 155, No. 2, 2008, pp. A103-A109.
Mohtadi, R. et al., "Magnesium Borohydride: From Hydrogen Storage to Magnesium Battery," Angewandte Communications International Edition, vol. 51, 2012, pp. 9780-9783.
Mohtadi, R. et al., "Magnesium batteries: Current state of the art, issues and future perspectives," Beilstein Journal of Nanotechnology, vol. 5, 2014, pp. 1291-1311.
Muldoon, J. et al., "Electrolyte roadblocks to a magnesium rechargeable battery," Energy & Environmental Science, vol. 5, 2012, pp. 5941-5950.
Muldoon, J. et al., "Quest for Nonaqueous Multivalent Secondary Batteries: Magnesium and Beyond," Chemical Reviews, vol. 114, 2014, pp. 11683-11720.
Piper, D. et al., "Conformal Coatings of Cyclized-PAN for Mechanically Resilient Si non-Composite Anodes," Advanced Energy Materials, vol. 3, 2013, pp. 697-702.
Selim, R. et al., "Some Observations on Rechargeable Lithium Electrodes in a Propylene Carbonate Electrolyte," Journal of the Electrochemical Society, vol. 121, No. 11, 1974, pp. 1457-1459.
Shiga, T. et al., "Anode Material Associated with Polymeric Networking of Triflate Ions Formed on Mg," Journal of Physical Chemistry C, vol. 119, 2015, pp. 3488-3494.
Son, S. et al., "A Stabilized $PAN-FeS_2$ Cathode with an EC/DEC Liquid Electrolyte," Advanced Energy Materials, vol. 4, 2014, 5 pages.
Wang, H. et al., "A novel type of one-dimensional organic selenium-containing fiber with superior performance for lithium-selenium and sodium-selenium batteries," RSC Advances, vol. 4, 2014, pp. 61673-61678.
Xu, K., "Nonaqueous Liquid Electrolytes for Lithium-Based Rechargeable Batteries," Chemical Review, vol. 104, 2004, pp. 4304-4417.
Yoo, H. et al., "Mg rechargeable batteries: an on-going challenge," Energy & Environmental Science, vol. 6, 2013, pp. 2265-2279.
Zhou, B. et al., "Theoretical study on the initial stage of a magnesium, battery based on a $V_2O_5$ cathode," Phys. Chem. Chem. Phys., vol. 16, 2014, pp. 18578-18585.
Search Report from corresponding PCT patent application No. PCT/US16/38793 dated Sep. 19, 2016; 3 pages.
Written Opinion from corresponding PCT patent application No. PCT/US16/38793, dated Sep. 19, 2016, 7 pages.

* cited by examiner

US 10,930,928 B2

MAGNESIUM METAL DEVICES AND METHODS OF MAKING THE SAME

CROSS-REFERENCE TO RELATED APPLICATIONS

This application claims the benefit of U.S. Provisional Application No. 62/182,978 filed Jun. 22, 2015, the content of which is incorporated herein by reference in its entirety.

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

BACKGROUND

Current and historical incremental improvements to lithium-ion (Li-ion) batteries may not be sufficient to meet the anticipated demands of energy security, sustainability, and climate change. Magnesium metal may provide advantages relative to lithium, including increased abundance ($5^{th}$ most abundant element on the earth) and improved environmentally-friendly physical properties. Therefore, magnesium metal batteries represent a new class of potentially ultrahigh-energy-density power sources useful for rechargeable batteries. However, magnesium metal presents numerous technical challenges including the inability for reversible deposition in most aprotic solvents containing currently commercial ionic salts, such as magnesium(II) bis(trifluoromethane sulfonyl) imide ($Mg(TFSI)_2$) and $MgClO_4$. Some success has been had with Grignard and magnesium organohaloaluminates-based electrolytes. However, the corrosive nature of these electrolytes has severely limited their usefulness in battery systems. Thus, there remains a need for improved magnesium metal-based battery components, batteries, battery systems, and methods of making such components, batteries and/or systems.

SUMMARY

An aspect of the present disclosure is a device that includes a first electrode, where the first electrode includes magnesium metal having a first surface, and a first coating in physical contact with the first surface and covering substantially all of the first surface, where the first coating has a first thickness, and the first coating is configured to transport a plurality of magnesium ions through the first thickness, such that a first portion of the plurality of magnesium ions are reversibly depositable as elemental magnesium onto the first surface. In some embodiments of the present disclosure, the magnesium metal may be in the form of a particle, a film, a foil, a pellet, a cylinder, and/or a sphere. In some embodiments of the present disclosure, the first coating may include a first polymer. In some embodiments of the present disclosure, the first polymer may include at least one of a polyacrylonitrile (PAN), a cyclized polyacrylonitrile (cPAN), a polyimide, a polyamide, a polystyrene, a polyethylene, a polyether, poly(3,4-ethylenedioxythiophene), a polypyrrole, a polythiophene, a polyaniline, a polyacetylene, a polyparaphenylene, a polyethylene oxide, and/or a polyethylene glycol. In some embodiments of the present disclosure, the first polymer may be cPAN.

In some embodiments of the present disclosure, the first coating may further include a magnesium-ion salt. In some embodiments of the present disclosure, the magnesium-ion salt may include at least one of $MgClO_4$, $Mg(PF_6)_2$, $Mg(CF_3SO_3)_2$, $MgCO_2$, $Mg(BF4)_2$, $Mg(NO_3)_2$, and/or magnesium(II) bis(trifluoromethane sulfonyl) imide ($Mg(TFSI)_2$). In some embodiments of the present disclosure, the first coating may have a thickness between about 1 nm and about 500 nm. In some embodiments of the present disclosure, the device may further include an electrolyte, where the electrolyte may be in physical contact with the first coating. In some embodiments of the present disclosure, the electrolyte may include at least one of a nitrile and/or a carbonate. In some embodiments of the present disclosure, the electrolyte may include at least one of acetonitrile and/or propylene carbonate. In some embodiments of the present disclosure, the electrolyte may further include a magnesium-ion salt. In some embodiments of the present disclosure, the magnesium-ion salt may include at least one of $MgClO_4$, $Mg(PF_6)_2$, $Mg(CF_2SO_3)_2$, $MgCO_3$, $Mg(BF4)_2$, $Mg(NO_3)_2$, and/or magnesium(II) bis(trifluoromethane sulfonyl) imide ($Mg(TFSI)_2$). In some embodiments of the present disclosure, the first portion may be between about 80% and about 100% of the plurality of magnesium ions.

In some embodiments of the present disclosure, the first electrode may further include a first current collector, the first current collector may be in contact with the magnesium metal, and the magnesium metal may be positioned between the first current collector and the first coating. In some embodiments of the present disclosure, the device may further include a second electrode including $V_2O_5$, where a second portion of the plurality of magnesium ions may be reversibly intercalateable in the $V_2O_5$, and the second electrode may be in physical contact with the electrolyte. In some embodiments of the present disclosure, the device may further include a second electrode including magnesium metal having a second surface, and a second coating in physical contact with the second surface and covering substantially all of the second surface, where the second coating has a second thickness, and the second coating may be configured to transport a third portion of the plurality of magnesium ions through the second thickness, such that a fourth portion of the plurality of magnesium ions may be reversibly depositable as elemental magnesium onto the second surface.

An aspect of the present disclosure is an electrode including magnesium metal having a surface, and a coating in physical contact with the surface and covering substantially all of the surface, where the coating has a thickness, and the coating is configured to transport a plurality of magnesium ions through the thickness, such that a portion of the plurality of magnesium ions are reversibly depositable as elemental magnesium onto the surface.

An aspect of the present disclosure is a method for charging and discharging a battery, the method including, in a first electrode having a magnesium metal, converting a first portion of the first magnesium metal to a first plurality of $Mg^{2+}$ ions, transferring a first portion of the first plurality of $Mg^{2+}$ ions through a first coating substantially covering the magnesium metal, transferring the first portion of the first plurality of $Mg^{2+}$ ions through an electrolyte in physical contact with the first coating, transferring first portion of the first plurality of $Mg^{2+}$ ions through a second coating substantially covering a magnesium metal of a second electrode, and converting the first portion of the first plurality of $Mg^{2+}$ ions to elemental magnesium on the magnesium metal of the second electrode, where the second coating is in physical contact with the electrolyte.

In some embodiments of the present disclosure, the method may further include converting the elemental magnesium on the magnesium metal of the second electrode to a second plurality of $Mg^{2+}$ ions, transferring the second plurality of $Mg^{2+}$ ions through the second coating, transferring the second plurality of $Mg^{2+}$ ions through the electrolyte, transferring second plurality of $Mg^{2+}$ ions through the first coating, converting the second plurality of $Mg^{2+}$ ions to elemental magnesium on the magnesium metal of the first electrode.

DRAWINGS

Some embodiments are illustrated in referenced figures of the drawings. It is intended that the embodiments and figures disclosed herein are to be considered illustrative rather than limiting.

Figure 6A:
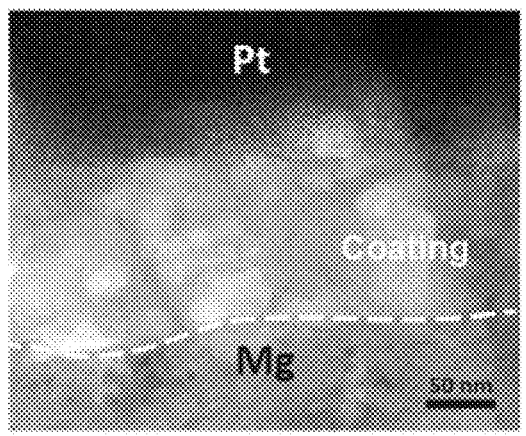
Figure 6B:
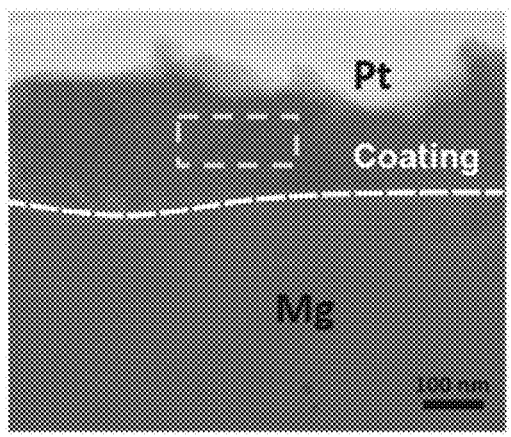
Figure 6C:
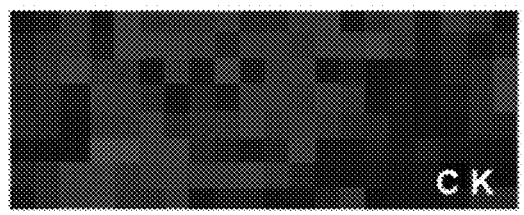
Figure 6D:
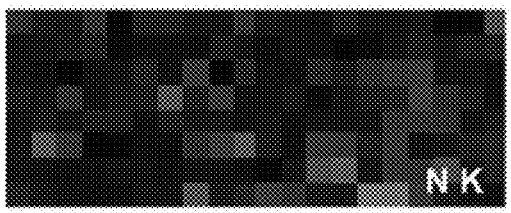
Figure 6E:
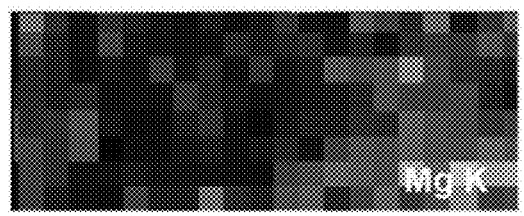
Figure 6F:
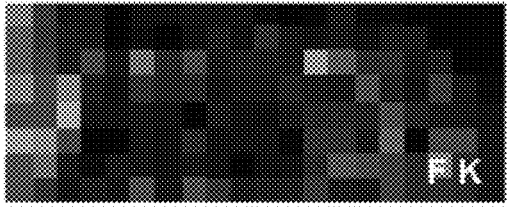
Figure 6G:
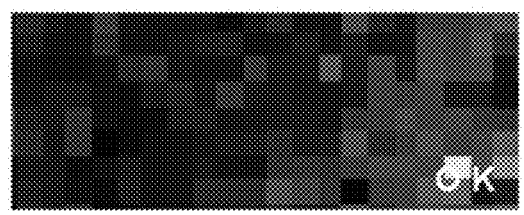
Figure 6H:
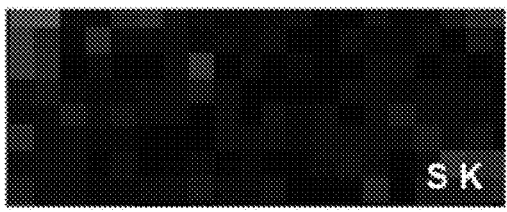

FIGS. 6a through 6h illustrate detailed TEM observations of $Mg^{2+}$-conducting coatings, according to some embodiments of the present disclosure. FIG. 6a illustrates a TEM image of magnesium metal with a $Mg^{2+}$ conductive coating. A conformal coating thickness of about 100 nm is observed on the magnesium metal surface. FIG. 6b illustrates HAADF mode observations of magnesium metal with a $Mg^{2+}$ conductive coating. EDS mapping area is indicated within the rectangular box of FIG. 6b. FIGS. 6c-h illustrate the corresponding EDS mapping results of carbon, nitrogen, magnesium, fluorine, oxygen, and sulfur respectively, in the coating.

Figure 7:
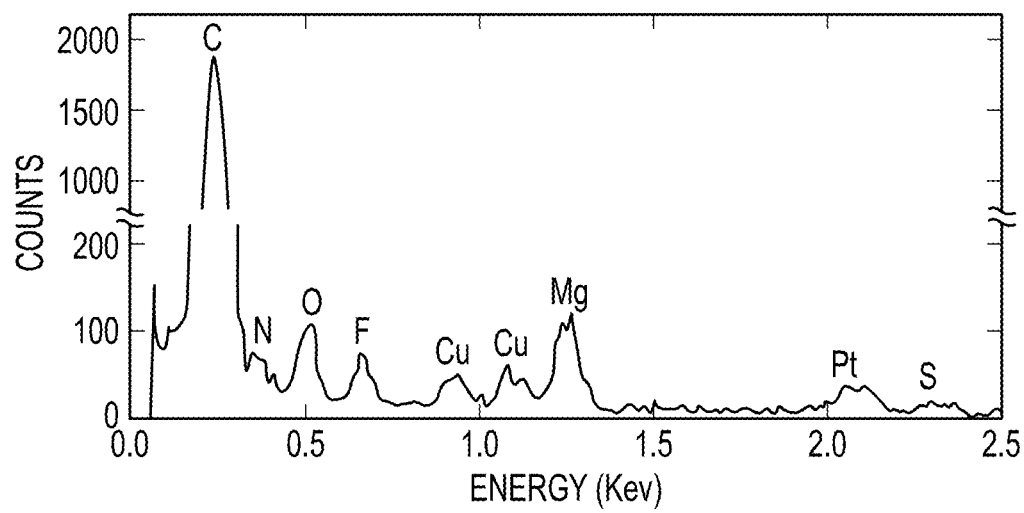

FIG. 7 illustrates the EDS signal of a $Mg^{2+}$-conducting coating of a coated magnesium metal electrode, according to some embodiments of the present disclosure.

Figure 8:
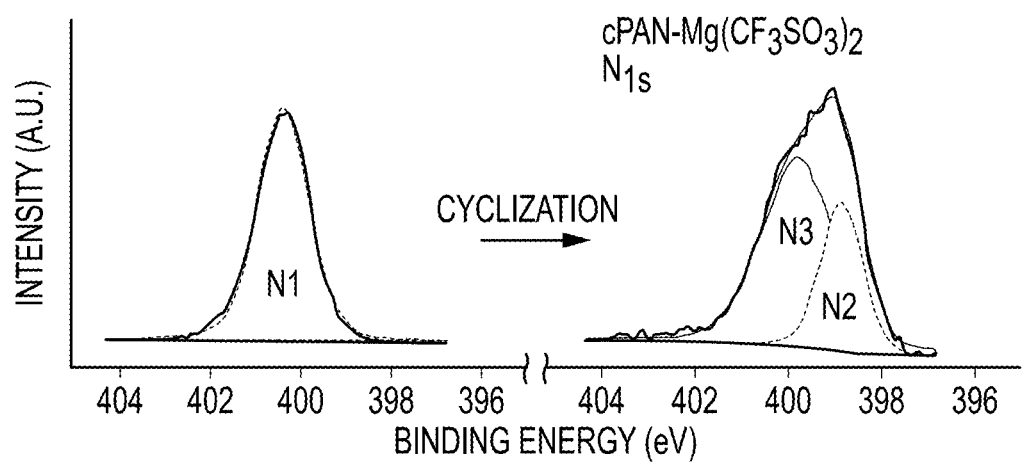

FIG. 8 illustrates XPS analysis of a $Ma^{2+}$-conducting coating, according to some embodiments of the present disclosure. XPS analysis of $N_{1s}$ shows the structural change of cyanic group (N1) to pyridinic (N2) and substitutional graphite group (N3) after conversion of non-cyclic polyacrylonitrile (PAN) to cyclized polyacrylonitrile (cPAN).

Figure 9A:
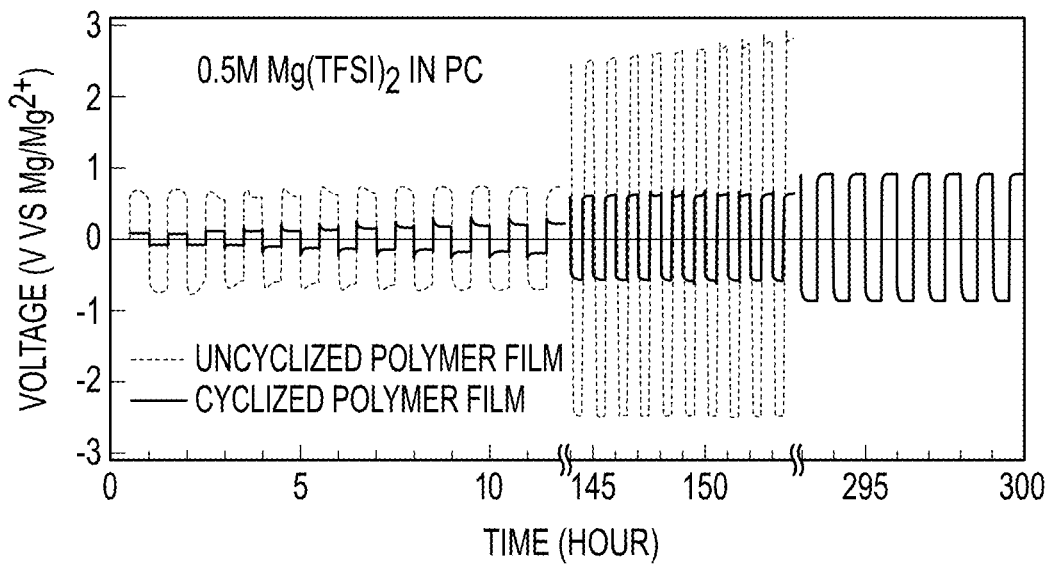

FIG. 9a illustrates a voltage versus time plot for symmetric magnesium metal cells, one having a cPAN $Mg^{2+}$-conducting coating and a second having a PAN $Mg^{2+}$-conducting coating, both with a current densities of about 0.01 mA $cm^{-2}$, according to some embodiments of the present disclosure.

Figure 9B:
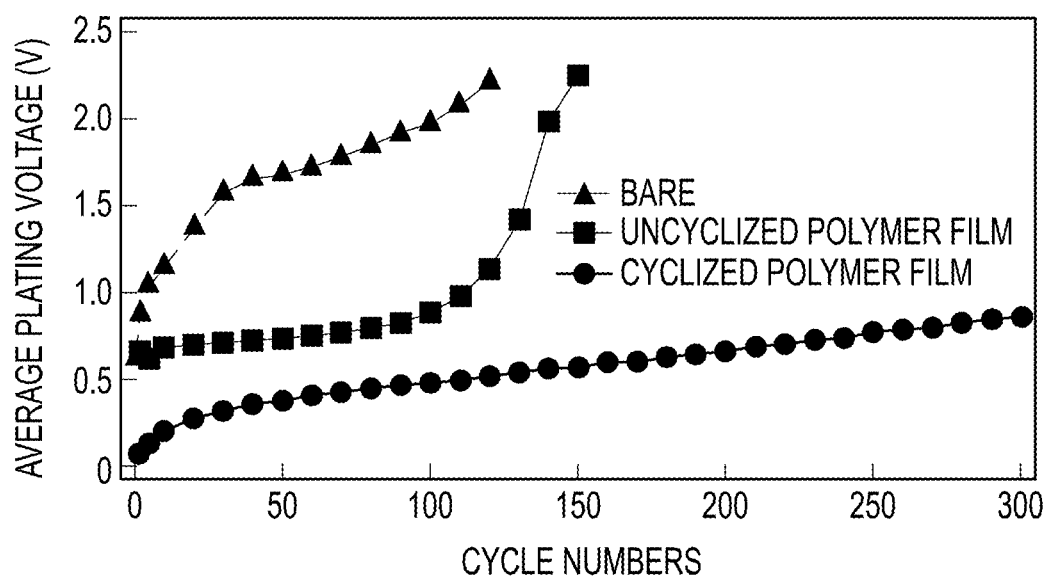

FIG. 9b illustrates an average plating voltage versus cycle numbers plot for symmetric magnesium metal cells, a first uncoated magnesium metal cell, a second magnesium metal cell having a PAN $Mg^{2+}$-conducting coating, and a third magnesium metal cell having a cPAN $Mg^{2+}$-conducting coating, all with a current densities of about 0.01 mA $cm^{-2}$, according to some embodiments of the present disclosure.

Figure 10A:
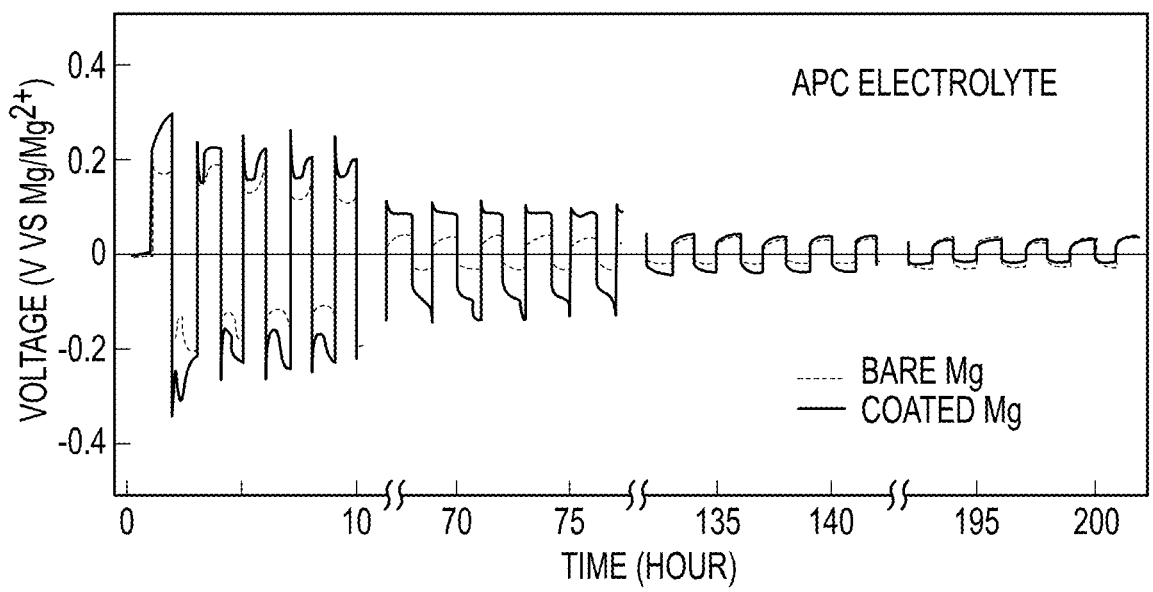
Figure 10B:
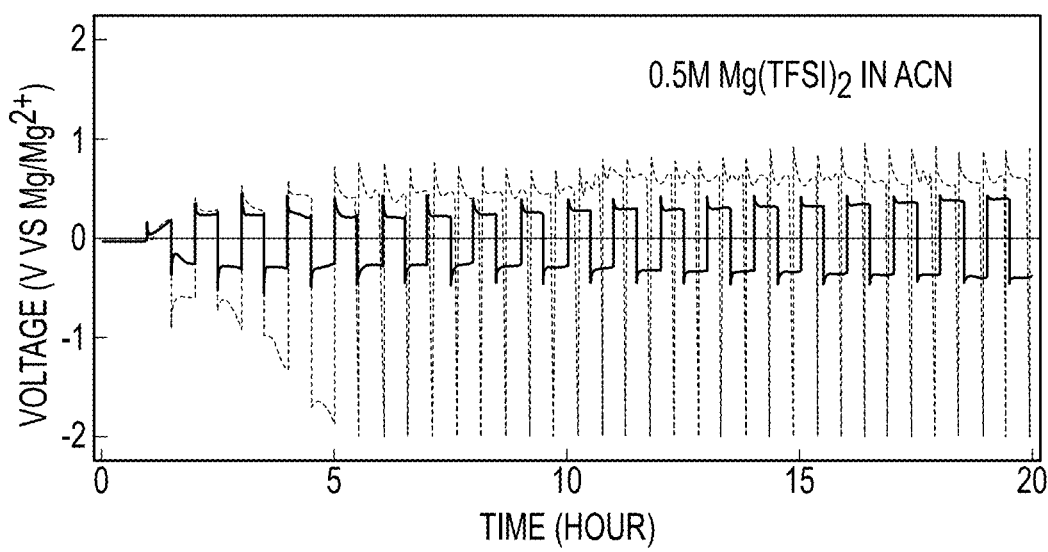
Figure 10C:
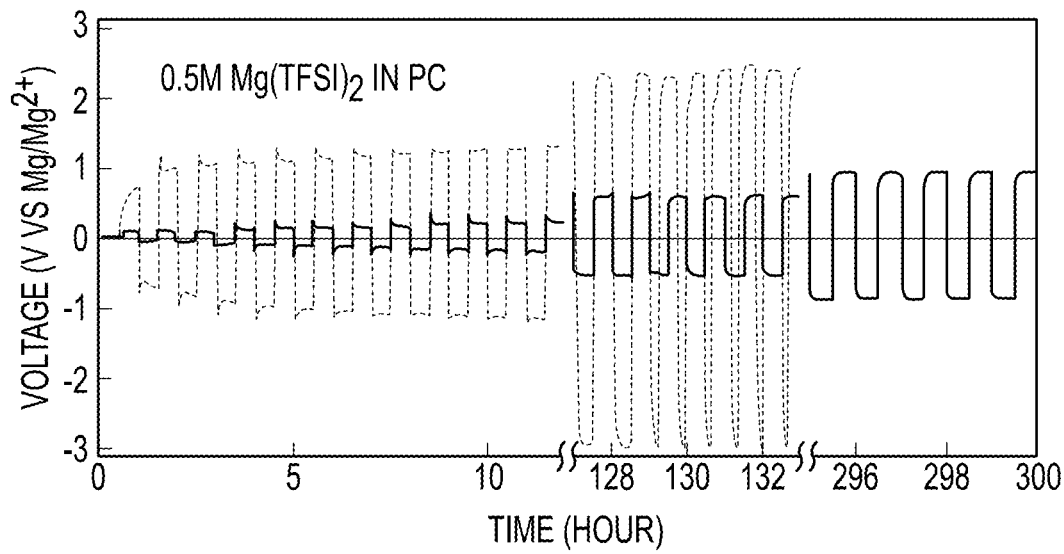
Figure 10D:
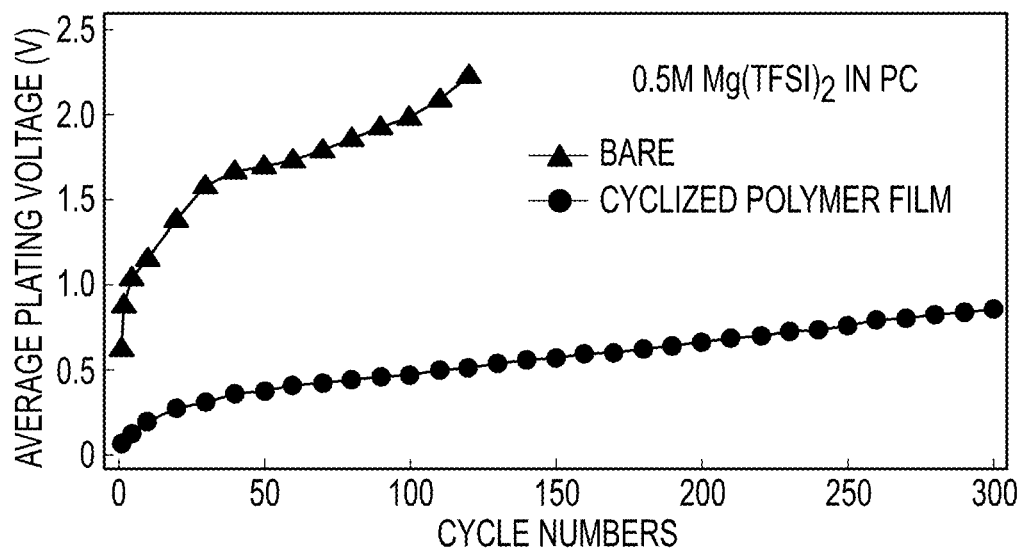

FIGS. 10a-c illustrate voltage versus time plots for symmetric magnesium metal cells with and without a coating under different electrolyte system, each having a current density of 0.01 mA $cm^{-2}$, according to some embodiments of the present disclosure. FIG. 10d illustrates the average plating voltage versus cycle number for symmetric magnesium metal electrodes immersed in an electrolyte of 0.5M $Mg(TFSI)_2$ in PC, according to some embodiments of the present disclosure.

Figure 11A:
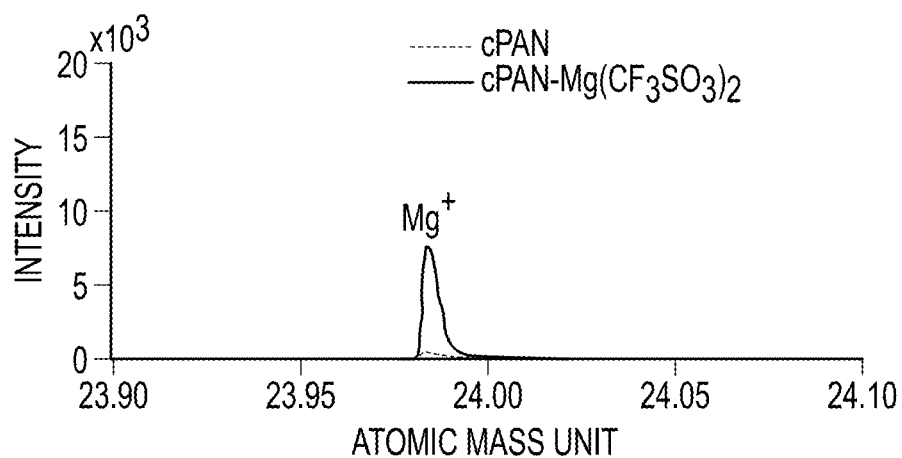
Figure 11B:
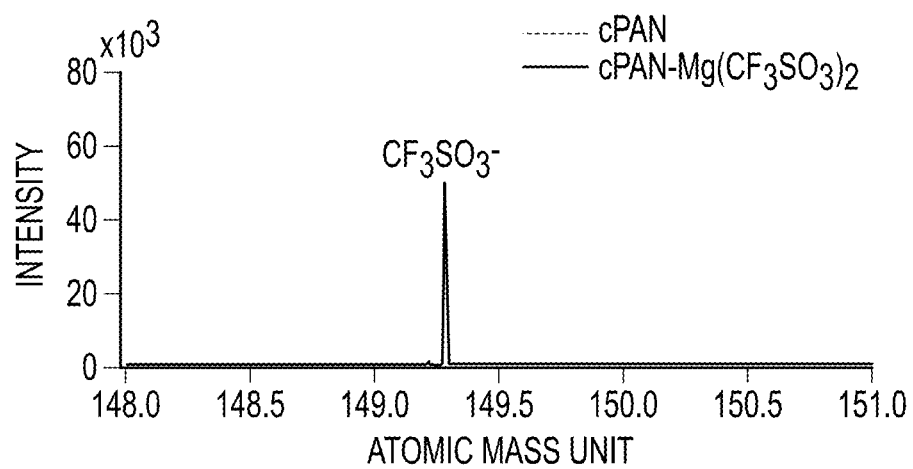
Figure 11C:
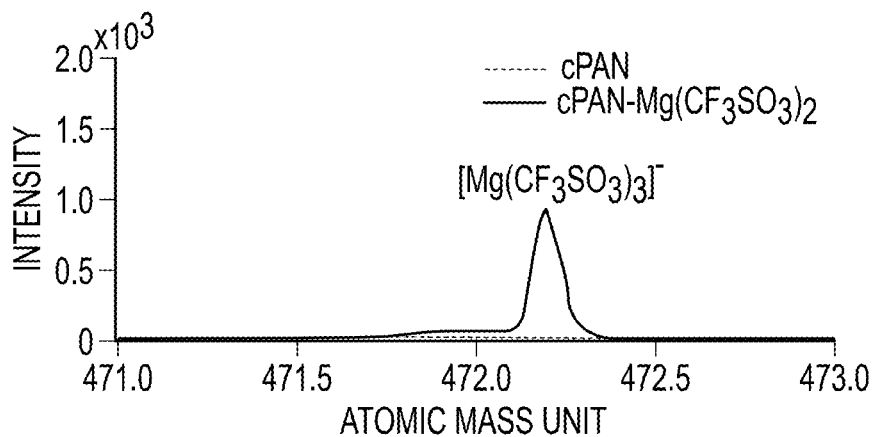
Figure 11D:
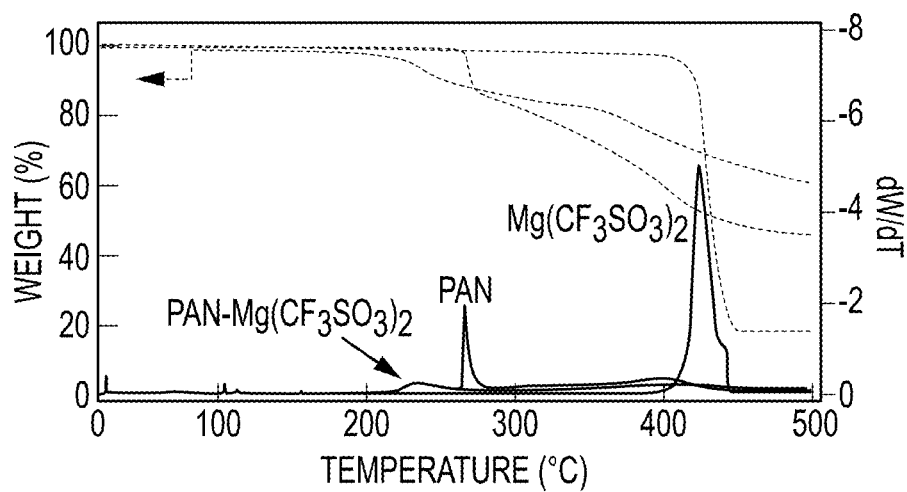
Figure 11E:
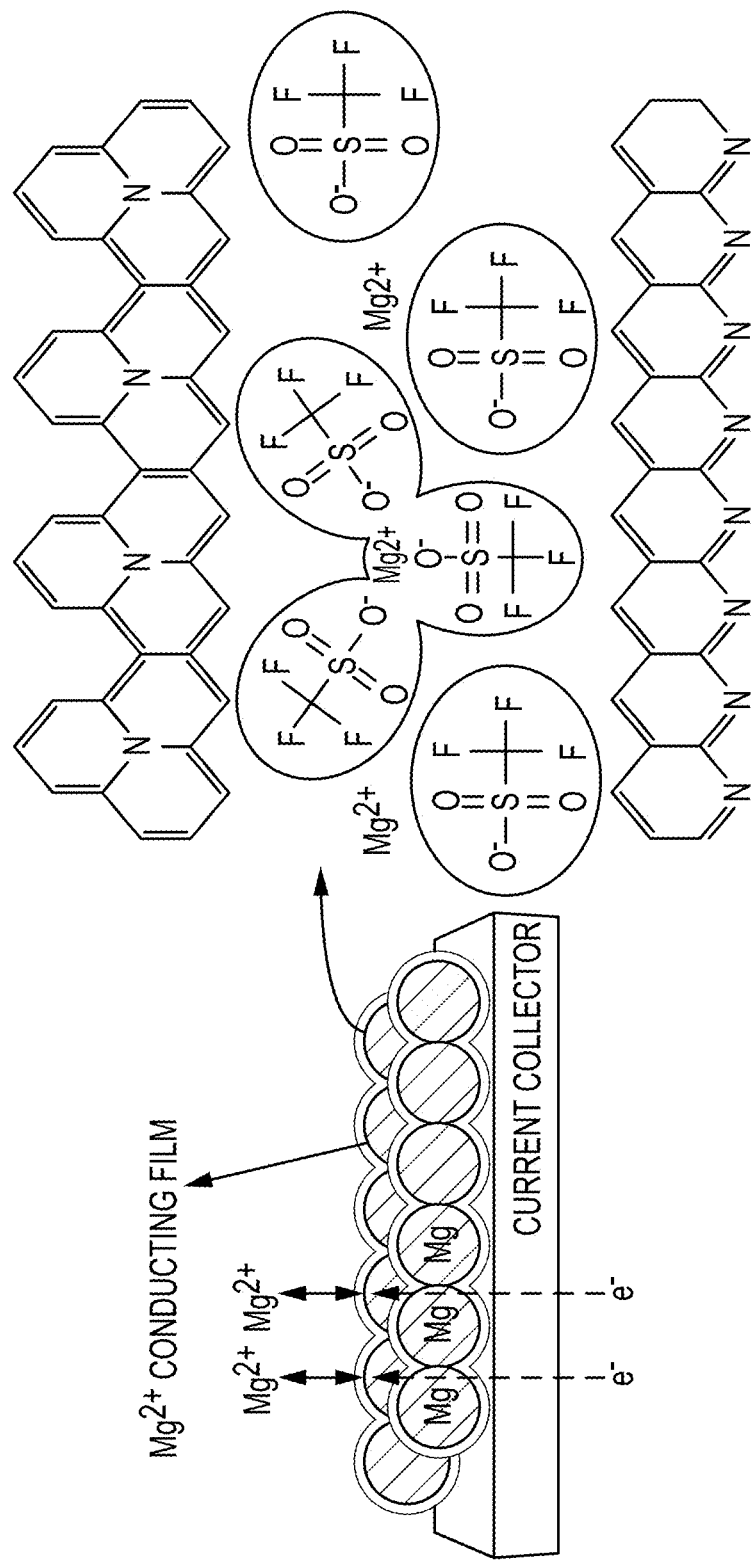

FIGS. 11a-c illustrate TOF-SIMS and TGA analysis of $Mg^{2+}$-conducting coatings, according to some embodiments of the present disclosure. FIG. 11a illustrates TOF-SIMS spectra for positive Mg ions signals of cPAN and cPAN-$Mg(CF_3SO_3)_2$. FIGS. 11b and 11c illustrate TOF-SIMS spectra for negative ions of cPAN and cPAN-$Mg(CF_3SO_3)_2$, respectively. Both signals for $CF_3SO_3^-$ and $[Mg(CF_3SO_3)_3]^-$ are only pronounced for cPAN-$Mg(CF_3SO_3)_2$. FIG. 11d illustrates TGA analysis of $Mg(CF_3SO_3)_2$, PAN and PAN-$Mg(CF_3SO_3)_2$. Weight losses (wt %) versus temperature (° C.) for $Mg(CF_3SO_3)_2$, PAN and PAN-$Mg(CF_3SO_3)_2$ are shown as dashed line. The differentiated plots (solid lines) indicates where thermal decompositions of the samples occur. FIG. 11e illustrates a schematic of a magnesium metal powder electrode coated with a $Mg^{2+}$-conducting coating and the estimated structure of the cPAN-$Mg(CF_3SO_3)_2$ based on XPS, TOF-SIMS and TGA analysis.

Figure 12:
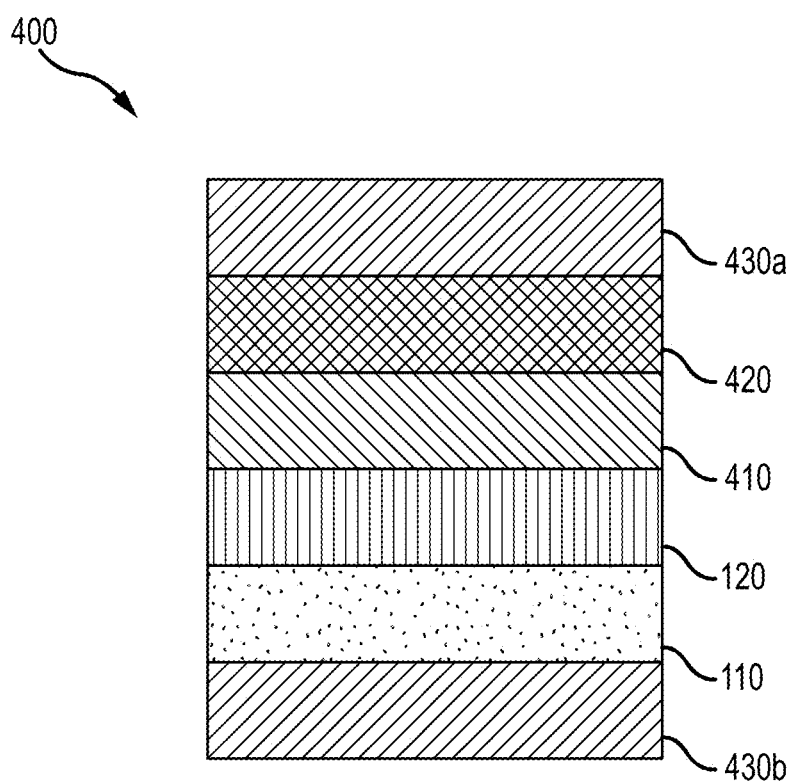

FIG. 12 illustrates the construction of a cell that includes a coated magnesium metal, according to some embodiments of the present disclosure.

Figure 13A:
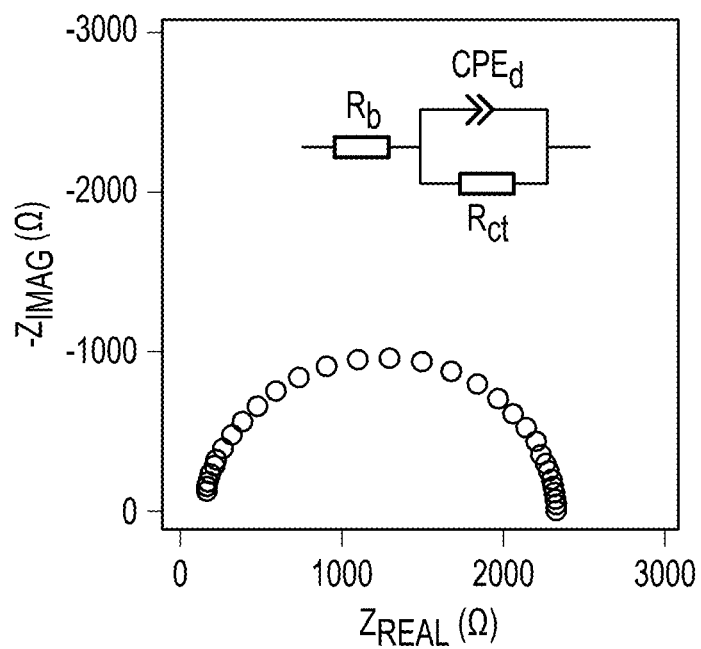
Figure 13B:
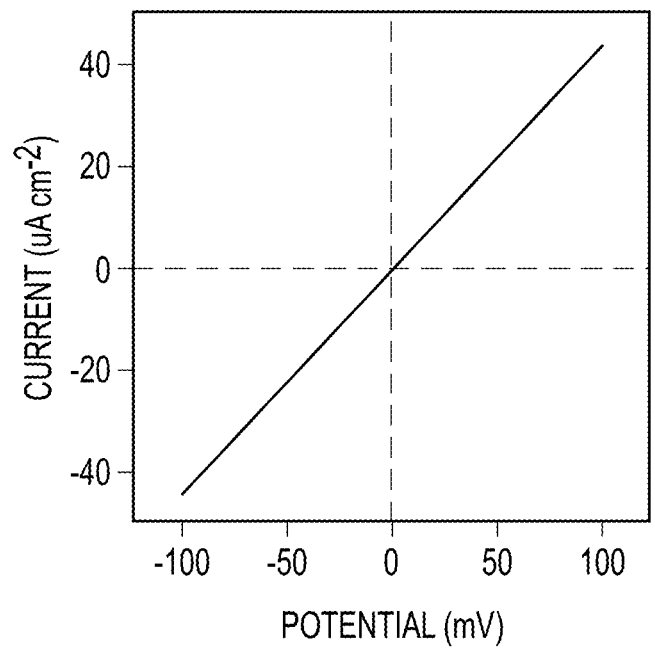

FIGS. 13a and 13b illustrate conductivity measurements of a $Mg^{2+}$-conducting coating on a surface of a magnesium metal surface, according to some embodiments of the present disclosure. FIG. 13a illustrates Nyquist plots resulting from EIS performed on a $Mg^{2+}$-conducting coating. FIG. 13b illustrates the results of a LSV test performed between −100 mV and 100 mV on a $Mg^{2+}$-conducting coating.

Figure 14A:
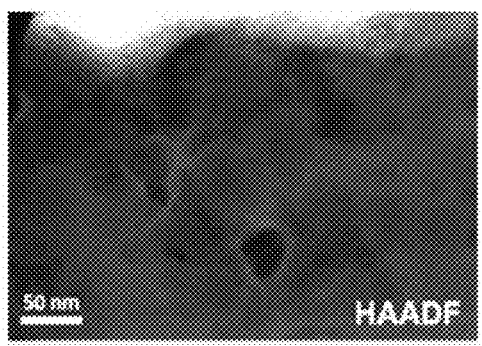
Figure 14B:
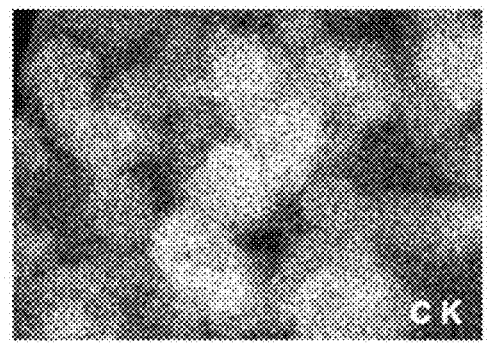
Figure 14C:
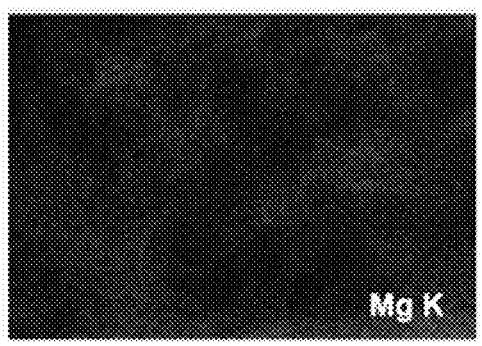
Figure 14D:
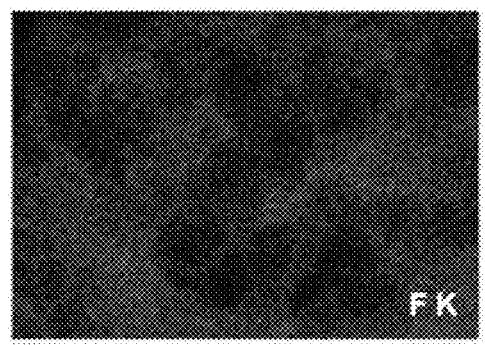
Figure 14E:
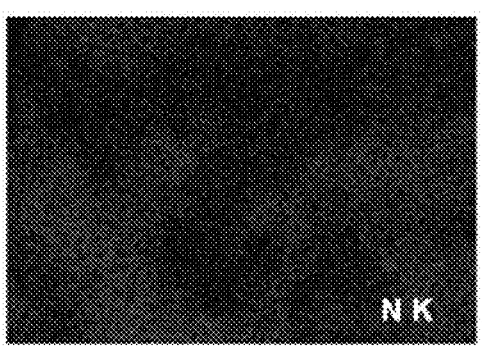
Figure 14F:
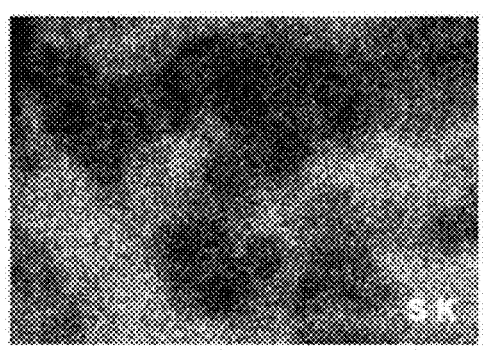
Figure 14G:
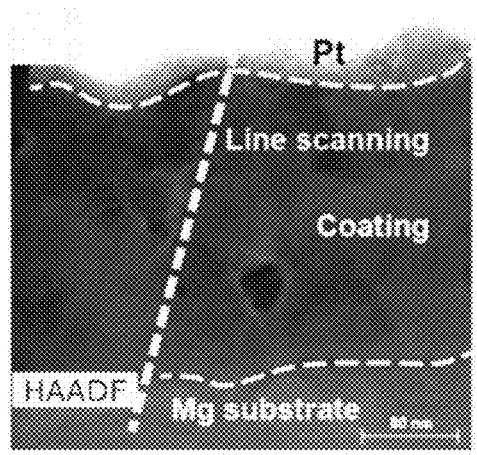
Figure 14H:
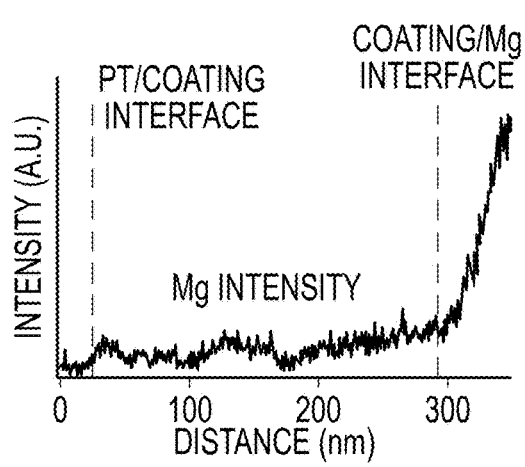

FIGS. 14b-f illustrate EDS data for a $Mg^{2+}$-conducting coating after 50 cycles in a symmetric cell, while FIG. 14a and FIG. 14g illustrate HAADF TEM images of the same $Mg^{2+}$-conducting coating after 50 cycles in a symmetric cell, according to some embodiments of the present disclosure. FIG. 14h illustrates EDS line scanning results for magnesium contained in the coating as a function of coating thickness, according to some embodiments of the present disclosure.

FIGS. 15a-d illustrate the electrochemical performance of a $Mg/V_2O_5$ system, according to some embodiments of the present disclosure.

Figure 16:
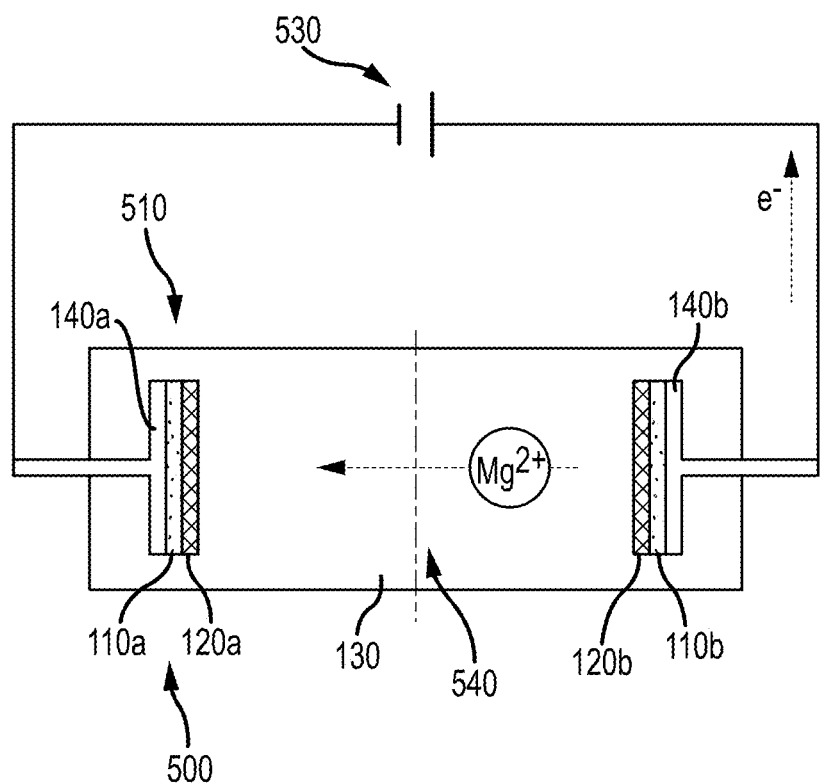

FIG. 16 illustrates a symmetric battery including two magnesium metal-containing electrodes, according to some embodiments of the present disclosure.

Figure 17:
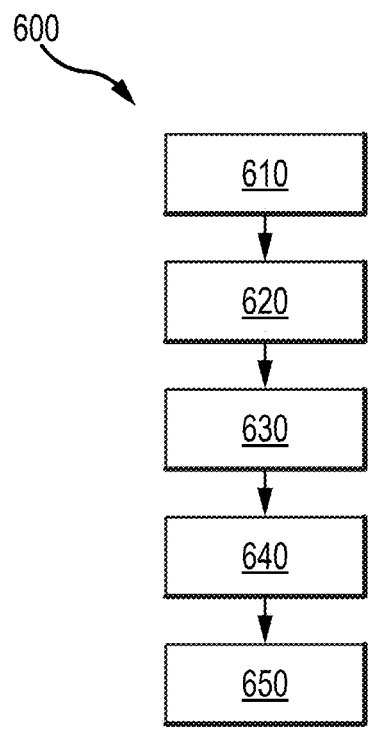

FIG. 17 illustrates a method for charging and/or discharging a magnesium metal-containing battery, according to some embodiments of the present disclosure.

REFERENCE NUMBERS

100 . . . electrode
110 . . . magnesium metal

120 . . . coating
130 . . . electrolyte
140 . . . current collector
150 . . . surface
200 . . . platinum layer
300 . . . interface
400 . . . cell
410 . . . silver paste
420 . . . carbon paper
430 . . . ion-blocking electrode
500 . . . battery
510 . . . anode
520 . . . cathode
530 . . . circuit
600 . . . method
610 . . . first converting
620 . . . first transferring
630 . . . second transferring
640 . . . third transferring
620 . . . second converting

DETAILED DESCRIPTION

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

The use of magnesium metal provides a high specific capacity (2,205 mAh g$^{-1}$ for Mg) and nearly doubles the volumetric capacity of lithium (Li) metal (3,832 mAh cm$^{-3}$ for Mg vs. 2,061 mAh cm$^{-3}$ for Li). A new concept is proposed here that takes advantage of these beneficial properties of magnesium metal by protecting a magnesium metal-containing electrode with a Mg$^{2+}$-conductive coating.

Figure 1A:
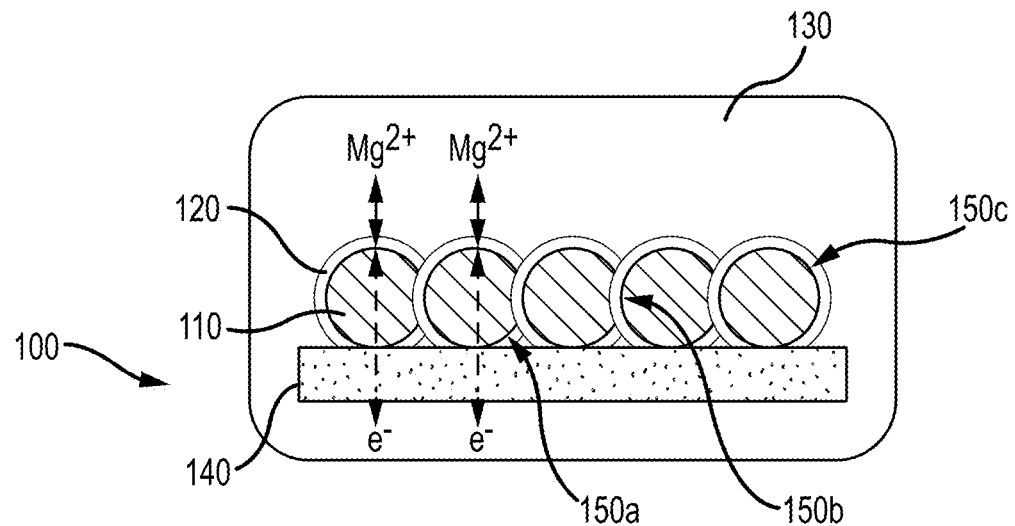
FIG. 1a illustrates an electrode that includes coated magnesium metal particles, according to some embodiments of the present disclosure.
Figure 1B:
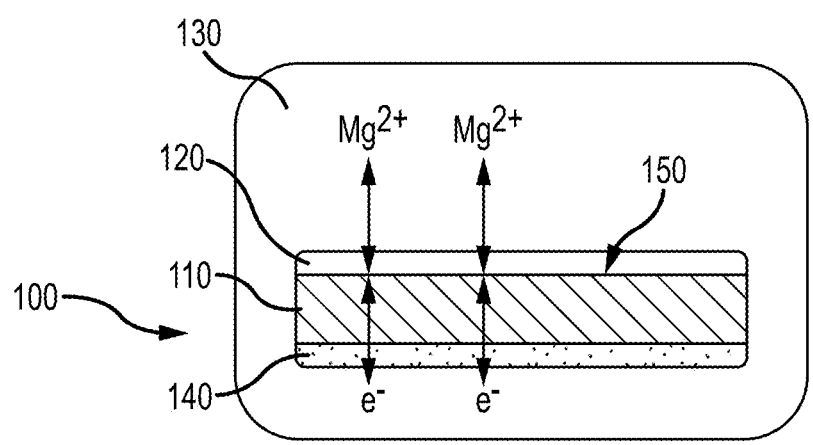
FIG. 1b illustrates an electrode that includes a coated magnesium metal foil, according to some embodiments of the present disclosure.
Figure 4:
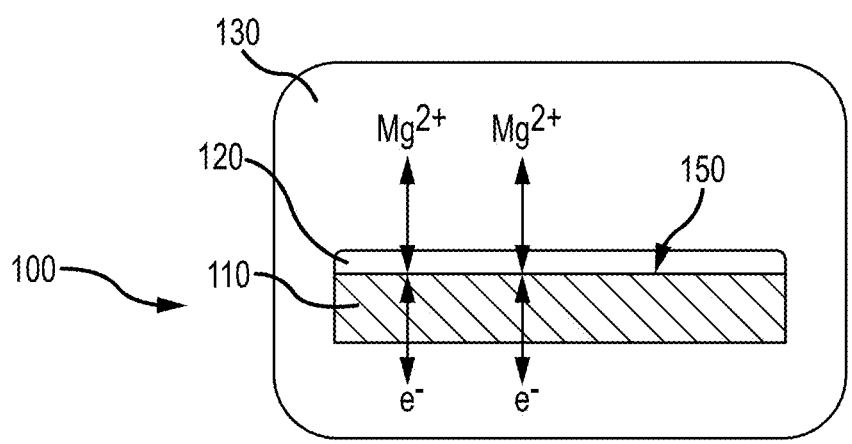
FIG. 4 illustrates an electrode constructed from a coated magnesium metal foil, according to some embodiments of the present disclosure.

FIG. 1a illustrates an exemplary electrode 100 utilizing magnesium metal 110 and a coating 120 positioned on a surface of the magnesium metal 110. The electrode 100 includes a current collector 140, upon which is deposited magnesium metal 110, in this example, in the form of solid magnesium metal particles, with a coating 120 applied to the outside surfaces of the magnesium metal particles. The electrode 100 may also be fabricated using a magnesium metal foil instead of, or in addition to the magnesium metal particles, as shown in FIG. 1b, in which case, the current collector 140 is optional. FIG. 1b shows a coating 120 applied to an outer surface 150 of the magnesium metal 110 foil. In addition, magnesium metal 110, may be substantially pure elemental magnesium (e.g. approaching 100% pure), and/or a magnesium-containing material, such as a magnesium alloy. The coating 120 may include a magnesium salt and a polymer such that the coating 120 may transport magnesium ions between an electrolyte 130 and the magnesium metal 110 (e.g. foil and/or particles). The coating 120 may be in physical contact with the electrolyte 130 to allow the reversible physical transport of magnesium ions (e.g. Mg$^{2+}$ as shown in FIGS. 1a, 1b, and 4) to and from the electrolyte 130 and to and from the magnesium metal 110. In this example, the coated magnesium metal 110 may be in physical contact with the current collector 140 to allow the reversible physical transport of electrons (e.g. e as shown in FIGS. 1a, 1b, and 4) to and from the circuit 530. Thus, by allowing the reversible transport of magnesium ions through the coating 120, the coating 120 may facilitate the reversible depositing and stripping of elemental magnesium onto and from the magnesium metal 110 (e.g. particles and/or foil), where the depositing of the elemental magnesium is represented by the reaction,

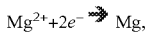

and the stripping of the elemental magnesium is represented by the reaction,

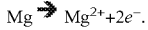

Without wishing to be bound by theory, it is believed that the stripping and depositing reactions occur on the outer surfaces (for example 150a-c) of the magnesium metal 110. Thus, referring again to FIG. 1a, Mg$^{2+}$ ions pass through the coating 120 to the outer surfaces (150a-c) of the magnesium metal 110 on which the Mg$^{2+}$ ions are converted to elemental magnesium (not shown), and then, upon cycling of the battery, the elemental magnesium on the outer surfaces (150a-c) of the magnesium metal 110 is converted back to the Mg$^{2+}$ ions. In some embodiments, cracks or fissures present in the magnesium metal 110 may provide additional surface area for the depositing and stripping reactions to occur.

In addition, the coating 120 may facilitate the reversible depositing and stripping of elemental magnesium (not shown) onto and from the surface 150 of the magnesium metal 110 without the electrolyte 130 interacting with the magnesium metal 110 to form an insulating passivation layer, for example on the outer surfaces of the magnesium metal 110. The magnesium metal 110 may be provided in any other suitable physical shape/form suitable for a particular electrode; e.g. the magnesium metal 110 need not be limited to particles or a foil. The magnesium metal 110 may contain impurities, and the magnesium metal 110 may be in the form of magnesium-based alloys, including magnesium-tin, magnesium-aluminum, magnesium-copper, magnesium-silicon, and or magnesium oxide.

As a result, an electrode 100 having a magnesium metal 110 with a coating 120 applied to at least a portion of the outer surfaces of the magnesium metal 110 may allow the use of both known magnesium electrolytes including Grignard reagents and hydride based anions in ethereal solvents, which tend to be vulnerable to oxidation, as well as other oxidation-resistant electrolytes such as Mg(ClO$_4$)2, Mg(PF$_6$)$_2$, Mg(TFSI)$_2$, Mg(CF$_3$SO$_3$)$_2$, Mg(BF4)$_2$, Mg(NO3)2 and/or MgCO$_3$ in propylene carbonate (PC), vinylene carbonate (VC), ethylene carbonate (EC), diethyl carbonate (DEC), dimethyl carbonate (DMC) and fluoroethylene carbonate (FEC), such that the coated magnesium metal 110 may result in better functioning magnesium metal-contained electrodes and battery systems. Thus, some of the embodiments described herein may enable the use of noncorrosive and commercially available electrolytes in nonaqueous Mg-metal batteries including Mg-ion, solid-state batteries, magnesium air, and/or sulfur batteries. In some cases, the coating 120 may include a hybrid coating composed of Mg-ion salts (e.g. MgClO$_4$, Mg(PF$_6$)$_2$, Mg(TFSI)$_2$, Mg(CF$_3$SO$_3$)$_2$, and/or MgCO$_3$, Mg(BF4)$_2$, Mg(NO3)2) and at least one polymer. Examples of suitable polymers include polyacrylonitrile (PAN), a cyclized polyacrylonitrile (cPAN), a polyimide, a polyamide, a polystyrene, a polyethylene, a polyether, poly(3,4-ethylenedioxythiophene), a polypyrrole, a polythiophene, a polyaniline, a polyacetylene, a polyparaphenylene, a polyethylene oxide, and/or a polyethylene glyco. Such coatings may address the mechanical, conductivity and stability requirements by protecting the magnesium metal 110, and as a result, enhance the short- and long-term performances of the magnesium metal-containing electrode 100 (and batteries utilizing such electrodes). A coating 120 may be applied to the magnesium metal 110 (e.g. particles and/or foil) by spin-coating, dip-coating, and/or any other suitable coating process, including wet processes and vapor deposition processes.

Figure 2A:
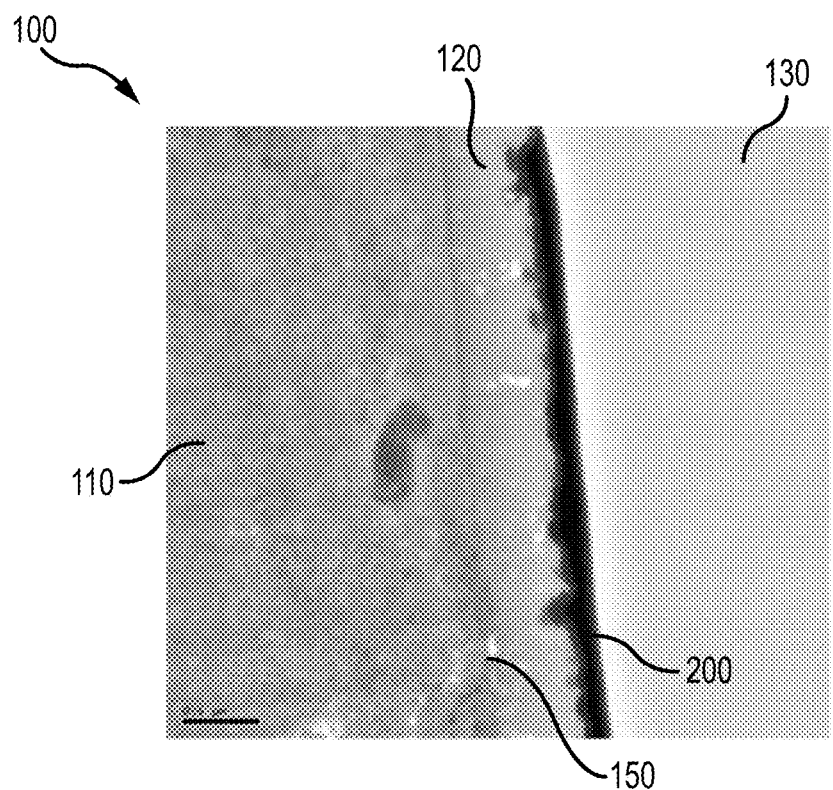
FIGS. 2a and 2b illustrate TEM images of coatings applied to magnesium metal foils, according to some embodiments of the present disclosure.
Figure 2B:
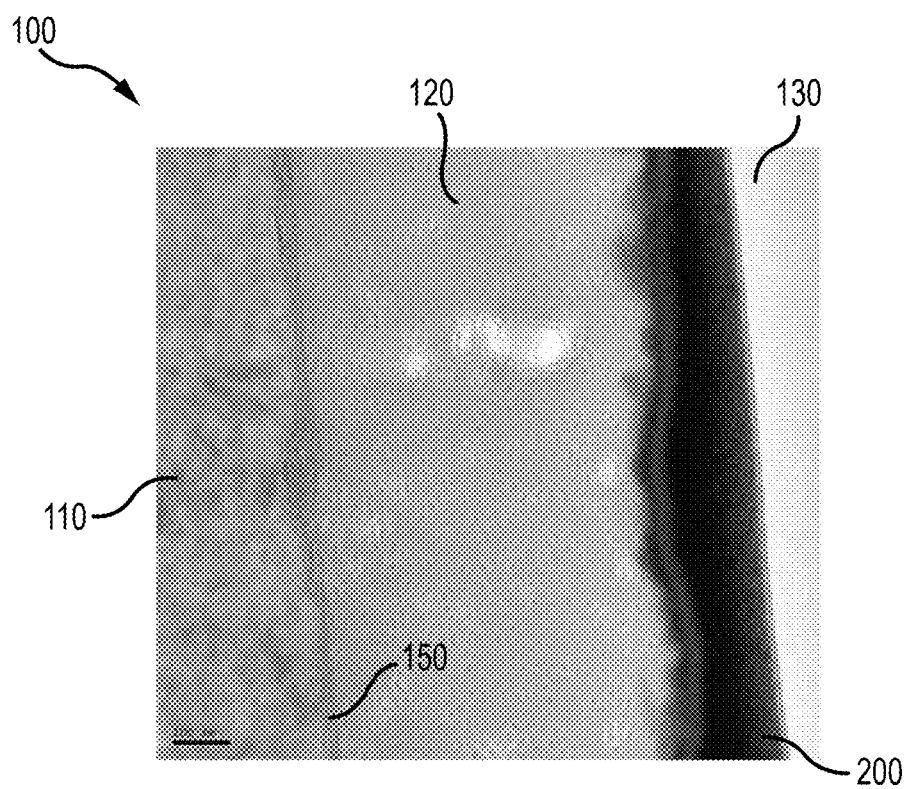
Figure 3:
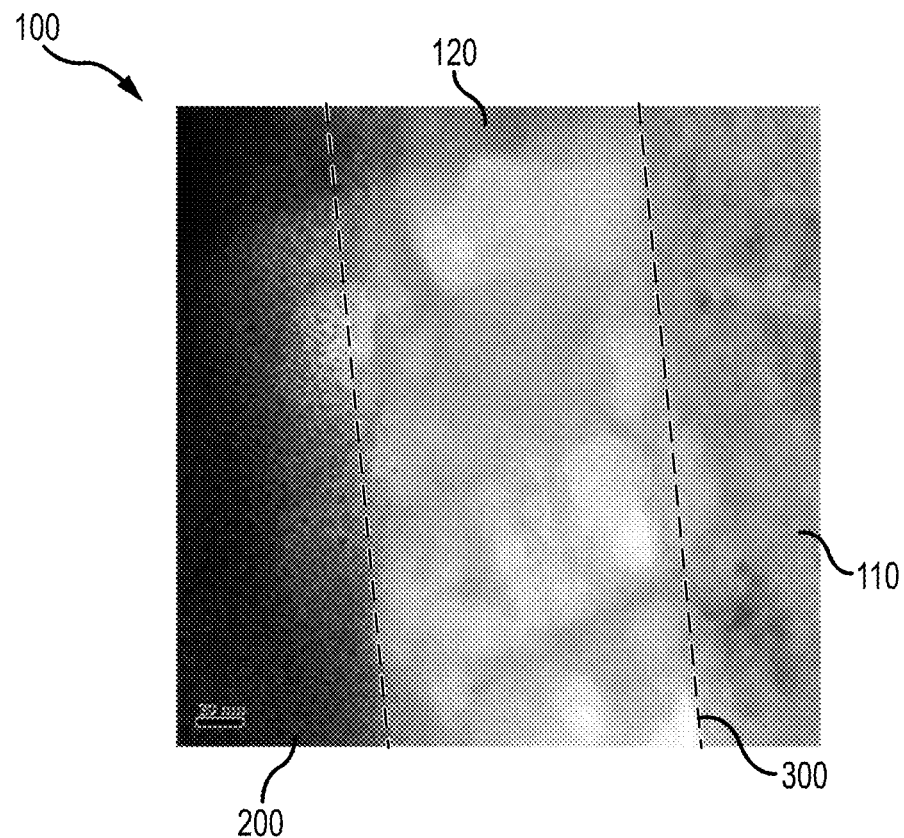
FIG. 3 illustrates TEM images of coatings applied to a magnesium metal particle, according to some embodiments of the present disclosure.

FIGS. 2a and 2b illustrate cross-section transmission electron microscopy (TEM) images of exemplary electrodes 100 that include magnesium metal 110, in the form of a magnesium foil, with a coating 120 applied to an outside surface 150 of the magnesium metal 110 foil. These figures also show a platinum layer 200, which was deposited on the coating 120 for purposes of the TEM method, and maintains the original morphology of the electrode 100. Therefore, the platinum layer 200 would not be included in an actual electrode used in a functioning battery. FIGS. 2a and 2b also indicate the areas where an electrolyte 130 would be positioned in a functioning battery and/or battery system. It should be understood, that for purposes of obtaining these TEM images, these areas were simply empty space, and electrolyte was not present during the imaging process. The coating 120 of FIG. 2b was determined to have a thickness of about 500 nm. FIG. 3 illustrates an example of an electrode 100 constructed from magnesium metal 110 with the magnesium metal 110 in powder form. In this case, the coating 120 was determined to have a thickness of about 100 nm. FIG. 3 also shows a platinum layer 200, which again, was deposited on the coating for imaging purposes. An electrode 100 for use in a functioning battery would not include such a platinum layer 200.

FIGS. 2a, 2b, and 3 illustrate that the coatings 120 applied to the outside surfaces of the magnesium metal 110 (e.g. in the physical form of particles and a foil) demonstrated good adhesion at the magnesium metal/coating interfaces (see reference numeral 300 in FIG. 3). The coverage of the magnesium metal 110 by the coating 120 and the adhesion of the coating 120 to the magnesium metal 110 are believed to protect the magnesium metal 110 from contacting the electrolyte 130. When magnesium metal is in direct contact with some noncorrosive, oxidation-resistant electrolytes, such as $Mg(TFSI)_2$ in acetonitrile (ACN) or $Mg(TFSI)_2$ in (PC) an/or analogous solvents, a passivation layer (not shown) may form on the outer surfaces 150 of the magnesium metal 110. Such passivation layers may prevent magnesium ion diffusion and the reversible depositing and stripping of magnesium in the magnesium metal 110 (e.g. particles, foil, and/or any other suitable form), resulting in decreased battery performance. The embodiments provided herein may protect the surface 150 of magnesium metal 110 of the electrodes 100 from reacting with the electrolyte 130, while maintaining the ability of magnesium ions to diffuse/migrate (e.g. as shown in FIGS. 1a, 1b, and 4), thus enabling the reversible stripping and depositing of magnesium in the magnesium metal 110, when using either non-ethereal-based electrolytes (e.g. $Mg(BH_4)_2$ in dimethoxyethane, diethylene glycol, triethylene glycol, and/or tetraethylene glycol) and/or more oxidation-resistant electrolytes, such as nitrile and/or carbonate electrolytes. Thus, oxidation-resistant electrolytes such as nitrile and/or carbonate electrolytes, may enable cathodes to operate at higher voltages, which may in turn enable the fabrication and use of high-energy rechargeable magnesium-metal based systems.

Referring again to FIGS. 2a, 2b, and 3, magnesium ions may be contained within the coating to provide ion conductivity that may enable the transport of magnesium ions from the electrolyte 130, through the coating 120, to at least the outer surfaces 150 of the magnesium metal 110, and vice versa (e.g. from the magnesium metal 110, through the coating 120, to the electrolyte 130). Without wishing to be bound by theory, isolating the magnesium metal 110 from the electrolyte 130 appears to allow this reversible transport of magnesium ions by preventing the side reaction between magnesium metal and the bulk electrolyte that typically results in the formation of one or more passivation layers. As illustrated in FIGS. 2a, 2b and 3, the magnesium metal 110 may be provided in any suitable shape or form, for example, as a substantially flat foil and/or in the form of particles, pellets, spheres, etc. FIG. 4 illustrates another example of an electrode 100 that includes magnesium metal 110 in the form of a foil with a coating 120 placed on a surface 150 of the magnesium metal 110, with the electrode 100 immersed in an electrolyte 130. A current collector (not shown) may also be included, positioned in contact with a second surface of the magnesium metal 110 foil.

Figure 5A:
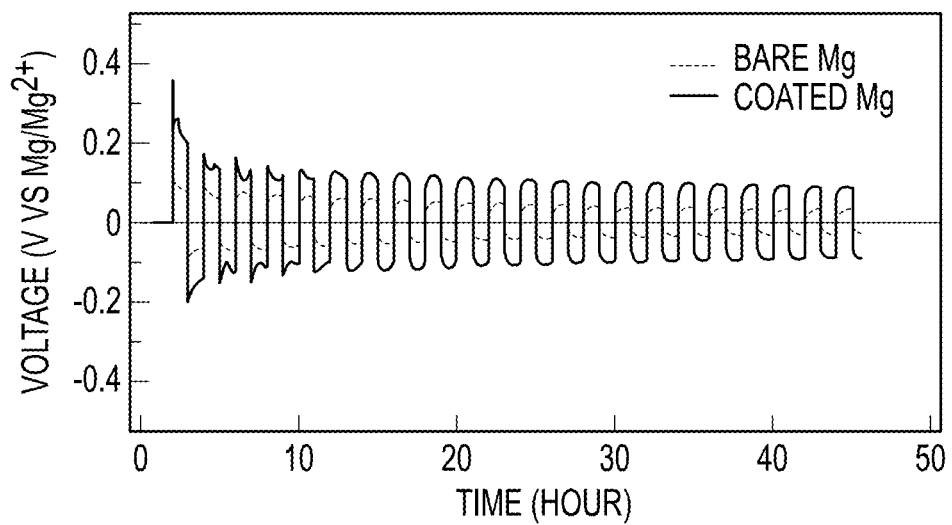
FIG. 5a illustrates experimental performance data collected from electrodes constructed using coated and uncoated magnesium metal powder, according to some embodiments of the present disclosure.

Reversible electrochemical stripping and depositing of magnesium in the magnesium metal foil and/or particles were performed to evaluate the Mg-ion conductivity and the chemical stability of the coatings described herein. Cell configurations consisting of two identical magnesium metal electrodes (referred to as "symmetric" cells) were used. The plots in FIG. 5a illustrate the voltage profile as a function of reaction time for two symmetric cells tested. A first symmetric cell utilizing uncoated magnesium metal electrodes (e.g. both anode and cathode comprising uncoated magnesium metal) was tested and a second cell using coated magnesium metal electrodes (e.g. both anode and cathode comprising coated magnesium metal) was also tested. A Grignard electrolyte APC (all phenyl complex, or $(PhMgCl)_2$—$AlCl_3$/THF) was used as an electrolyte because this electrolyte is compatible with uncoated magnesium metal. Thus, this electrolyte choice allows a comparison of the two symmetric cells using, uncoated magnesium metal versus coated magnesium metal. FIG. 5a shows that both the uncoated and coated magnesium metal electrodes allowed the reversible depositing and stripping of magnesium in the magnesium metal electrodes in both types of symmetric cells tested. The surface coating resulted in a magnesium metal electrode having a slightly higher potential than the uncoated magnesium metal electrode, at least initially. However, the overpotential of the coated magnesium metal electrode gradually decreased to the same level as the uncoated magnesium metal electrode for the later cycles. The reversibility of the stripping and depositing of magnesium in the coated magnesium metal electrode, as illustrated in FIG. 5a, also supports the occurrence of the reversible transport of magnesium ions through the coating.

Figure 5B:
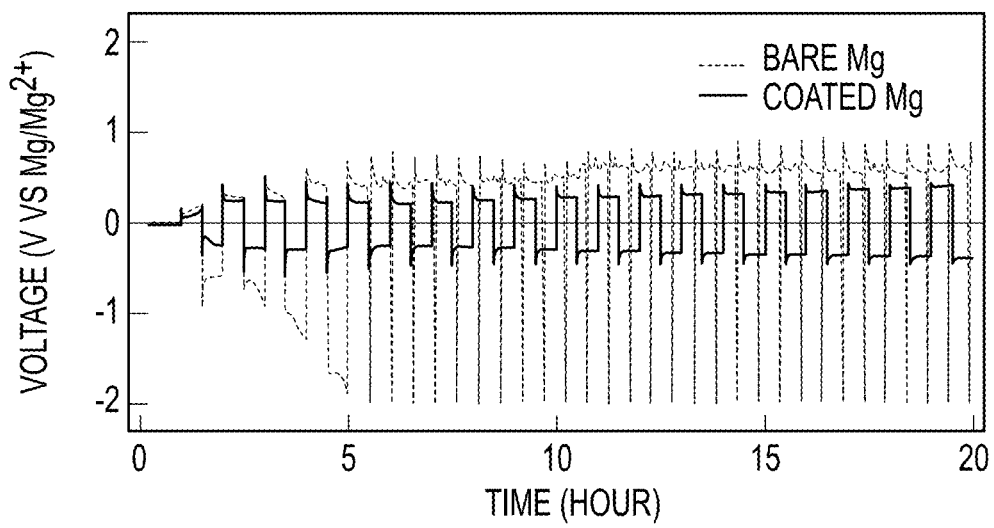
FIG. 5b illustrates experimental performance data collected from electrodes constructed using coated and uncoated magnesium metal foils, according to some embodiments of the present disclosure.

Other electrolytes may also be used. For example, an electrolyte that includes $Mg(TFSI)_2$ and (ACN) may form passivation layers on the surfaces of magnesium metal, with these layers potentially preventing the reversible stripping and depositing of magnesium in the magnesium metal electrode. Thus, such an electrolyte system was tested for two different symmetric cells, with the results illustrated in FIG. 5b, FIG. 5b illustrates the reversible stripping and depositing of magnesium in two cells using magnesium metal electrodes, both using an electrolyte of 0.5M $Mg(TFSI)_2$ in ACN. The cell using uncoated magnesium metal electrodes in an electrolyte of 0.5M $Mg(TFSI)_2$ in ACN failed to reversibly strip and deposit magnesium in the magnesium metal electrode because the conduction of magnesium ions into the magnesium metal electrode was in fact inhibited by the formation of a passivation layer on the magnesium metal electrode's surface. Contrary to the uncoated magnesium metal electrode, the coated magnesium metal electrode showed reversible magnesium ion stripping and depositing in the coated magnesium metal electrode, using the same electrolyte solution (0.5M $Mg(TFSI)_2$ in ACN), indicating that the surface of the magnesium metal did not form a passivation layer and continued to provide stable magnesium ion conduction through the coating, to and from the underlying magnesium metal surfaces. Thus, the protective and conductive nature of the coatings applied to the outside surfaces of the magnesium metal electrodes, enabled the use of an electrolyte of $Mg(TFSI)_2$ in ACN in a reversible magnesium metal battery system, whereas the same electrolyte was unsuccessful in batter systems utilizing uncoated magnesium metal electrodes due to the formation of a passivation layer(s) on the magnesium metal electrodes' surfaces.

Thus, in some embodiments described herein, reversible magnesium metal depositing and stripping may occur between the coating and the magnesium metal electrode, for example, on the outer surfaces of the magnesium metal electrode at the interface between the magnesium metal electrode and the coating (e.g. see reference numeral 300 of FIG. 3). By manipulating the coating composition and chemistry, coatings with suitable chemical stability, mechanical stability, and ionic conductivity may be developed to meet specific needs. Overall, this protective coating will have: 1) optimized mechanical properties; 2) the desired Mg-ion conductivity; and 3) chemical stability and compatibility in the magnesium ion-containing electrolytes.

In some cases, magnesium metal may be supplied in the form of a foil, ribbon, sheet, strip, particle, powder, and/or any other suitable form. When in the form of a foil, a magnesium metal foil may have a thickness between about 10 microns and about 1000 microns. In some cases a magnesium metal foil may have a thickness between about 80 and about 120 microns. When in the form of a particle and/or powder, a magnesium metal particle and/or powder having an average particle size between about 1 micron and about 100 microns. In other cases, a magnesium metal particle and/or powder may have an average particle size between about 30 micron and about 80 microns. In some cases, a magnesium metal powder may have particles that have a substantially irregular shape. In other cases, a magnesium metal powder may have particles with a substantially regular shape, including spherical, cylindrical, and/or any other suitable geometric shape.

EXAMPLES

The present disclosure relates to coatings applied to at least one surface of a magnesium metal electrode (e.g. anode and/or cathode) resulting in a coated magnesium metal electrode. The coatings are $Mg^{2+}$-conducting and enable the reversible depositing and stripping of magnesium in the magnesium metal electrode, as well as the reversible transport of magnesium ions through the coating itself, to and from the magnesium metal, and to and from the electrolyte. In addition, the coatings minimize and/or eliminate the reaction of magnesium present in the anode and/or cathode with the electrolyte present in the battery system, which enables the use of electrolyte solvents that are not ethereal-based and are more oxidation-resistant Some embodiments demonstrated herein, include coated magnesium metal electrodes positioned in nitrile- and/or carbonate-based electrolytes containing magnesium salts (e.g. $Mg(TFSI)_2$, and/or $Mg(ClO_4)_2$), in both symmetric magnesium cells and magnesium batteries having a $V_2O_5$ cathode and a magnesium metal anode. Such examples demonstrate the viability of $Mg^{2+}$-conducting coatings and their viability as a solid-electrolyte-interface (SEI) on the surface of magnesium metal electrodes, which in turn, opens avenues for new magnesium electrolytes that may lead to high voltage (>3.0 V) magnesium batteries.

In some embodiments of the present disclosure, a coating on a magnesium metal electrode may be constructed using a $Mg^{2+}$-conducting polymer such as a cPAN containing magnesium trifluoromethanesulfonate $(Mg(CF_3SO_3)_2$. For example, annealing PAN converts it to cPAN (see FIG. 11e), which is a pyridine based conjugated polymer having excellent mechanical resiliency. Under high-resolution transmission electron microscopy (HRTEM), such a polymeric coating has a thickness of around 100 nm as shown in FIG. 6a. Further microstructure observations were obtained using high angle annular dark field (HAADF, see FIG. 6b) mode and energy dispersive spectroscopy (EDS, FIGS. 6c-h) mapping. HAADF shows the compositional difference between the coating and the magnesium metal particles as shown in weak contrast, while the latter maps the elemental distribution of carbon, nitrogen, magnesium, and fluorine, respectively, across the selected area of the coated magnesium metal electrode, which reflects the distribution of $Mg^{2+}$ and $(CF_3SO_3)^-$ anions in the cPAN-matrix. EDS spectra of corresponding mapping area are also shown in FIG. 7. The signal in FIG. 7 clearly shows peaks matched with carbon, nitrogen, oxygen, fluorine, magnesium, and sulfur, respectively. Additional signals of copper are from the TEM sample holder and platinum is from the surface protective layer that is deposited during the focused ion beam (FIB) work. X-ray photoelectron spectroscopy (XPS) of N is domain in FIG. 8 depicts the annealing-induced structural evolution of the polymeric coating. Cyanic group (N1, C≡N, at 400.4 eV) that was present in the pristine PAN (e.g. non-cyclic) matrix, prior to annealing, was found to gradually convert to the mixture of pyridinic group (N2, C—N=C, at 398.8 eV) and substitutional graphite group (N3, N coordinated with three C atoms, at 399.8 eV). Thus, as used herein, "annealing" refers to the thermal treatment of an electrode, magnesium, and/or coating, such that the electrode, magnesium, and/or coating are brought to an elevated temperature and maintained at that temperature for a period of time. Such an elastic polymeric component may accommodate the drastic volumetric changes during reversible depositing/stripping of magnesium. FIG. 9 also compares reversible magnesium depositing/stripping performances of magnesium metal electrodes coated with cPAN versus magnesium metal electrodes coated with PAN. FIG. 9a illustrates reversible magnesium depositing/stripping using a 0.5M $Mg(TFSI)_2$ in PC electrolyte. Each half cycle was for a period of half an hour. A coated magnesium metal electrode having a cPAN $Mg^{2+}$-conducting coating improved cycle stability and showed stable reversible magnesium depositing/stripping up to 300 cycles, using the same electrolyte, relative to the magnesium metal electrode having a coating of non-cyclic PAN. A coated magnesium metal electrode having an uncylized $Mg^{2+}$-conducting coating showed an initial overpotential up to 0.8 V. A continuous increase of the overpotential up to 3.0 V was observed after 150 cycles of reversible magnesium depositing/stripping in the magnesium metal electrode. FIG. 9b illustrates the average magnesium depositing voltage versus cycle numbers for symmetric coated magnesium metal electrodes using 0.5M $Mg(TFSI)_2$ in PC electrolyte. The magnesium metal electrode having a cPAN $Mg^{2+}$-conducting coating demonstrated much lower average plating voltages during cycling than the uncoated magnesium metal electrode and magnesium metal electrodes having a non-cyclic PAN $Mg^{2+}$-conducting coating. Improved reversible magnesium depositing/stripping performances, with less overpotential build-up, emphasize the benefits attainable using cPAN.

The reversibility of magnesium depositing and stripping in a coated magnesium metal electrode was tested using a symmetric cell configuration consisting of two identical coated magnesium metal electrodes. Three electrolyte systems were tested, which include the highly corrosive Grignard electrolyte APC as reference, and two other electrolyte systems based on a stable magnesium salt (0.5M $Mg(TFSI)_2$ dissolved first in ACN and second in PC. The latter two electrolytes are non-corrosive (at least not corrodes metal current collectors such as aluminum, stainless steel) and highly oxidation-resistant (not oxidized at lower voltages <3V vs Ma/Mg2+), but typically do not support reversible magnesium depositing and stripping in a magnesium metal electrode due to a reductive decomposition reaction on the magnesium metal surface(s). The magnesium depositing/stripping process was performed over half-hour or one-hour intervals with a cycling rate of 0.1 mA, $cm^{-2}$ and a voltage limit of 2 V for APC and ACN, or 3 V for PC system. FIG. 10a illustrates results for magnesium depositing and stripping in magnesium metal electrodes immersed in an APC electrolyte where each half cycle was for period of time of an hour. FIG. 10b illustrates results for magnesium depositing and stripping in magnesium metal electrodes immersed in 0.5M $Mg(TFSI)_2$ in ACN electrolyte, where each half cycle was for a period of time of half an hour. While the bare magnesium metal electrode system demonstrated a large over potential at the beginning and failed in 5 cycles, the system utilizing the coated magnesium metal electrodes demonstrated stable and reversible magnesium depositing and reversible magnesium stripping during all of the cycles of the test. FIG. 10c illustrates reversible magnesium depositing and reversible magnesium stripping in a magnesium metal electrode immersed in an electrolyte of 0.5M $Mg(TFSI)_2$ in PC, where each half cycle was performed for a period of time of half an hour. These data show that a $Mg^{2+}$-conducting coating on magnesium metal improves cycle stability with reversible magnesium depositing and stripping for up to at least about 300 cycles. FIG. 10d illustrates the average plating voltage versus cycle number for symmetric magnesium metal electrodes immersed in an electrolyte of 0.5M $Mg(TFSI)_2$ in PC. The coated magnesium metal electrode demonstrated a much lower average plating voltage than the uncoated magnesium metal electrode during cycling. This improved performance is attributed to the $Mg^{2+}$-conducting coating protecting the magnesium metal's surface from the electrolyte and preventing a passivation layer from forming.

Referring again to FIG. 10a, reversible depositing/stripping of magnesium in the magnesium metal electrodes was observed in an APC electrolyte for both uncoated and coated magnesium metal electrodes. Slightly higher plating overpotential (~0.1 V) was observed for the coated magnesium metal electrodes, during the first 100 hours, as compared with the uncoated magnesium metal electrodes, probably due to a physical barrier on the coating (as described previously). The overpotential of the coated magnesium metal electrode gradually decreased to the same level as the uncoated magnesium metal electrode. Despite this difference, the APC electrolyte allowed reversible magnesium depositing/stripping, in the presence of a coating as well as in the absence of a coating. When the electrolyte was switched to 0.5M $Mg(TFSI)_2$ dissolved in either ACN or PC electrolytes, however, the uncoated magnesium metal electrode experienced an extremely high overpotential (>1.0 V). FIG. 10 shows that the uncoated magnesium metal electrode failed in a nitrile-electrolyte after 5 hours, at which point the overpotential reached 2 V. Moreover, the coated magnesium metal electrode exhibited reversible depositing/stripping for more than 300 hours in the PC electrolyte, without a pronounced overpotential build-up during the extended cycles, as exhibited in FIG. 10c. This observation agrees with the theory that reductive decomposition reactions occurred as a result of the nitrite or carbonate electrolytes, which produced a magnesium ion diffusion limiting layer on the magnesium metal surfaces.

Thus, for ACN and PC electrolytes, reversible magnesium depositing and stripping was only observed in magnesium metal electrodes having a polymeric coating. This is the first time that either nitrile- or carbonate-based electrolytes have been shown to support reversible magnesium depositing/stripping in a magnesium metal electrode. As shown in FIG. 10d, the average plating voltage clearly reveals that the polymeric coating significantly reduced the magnesium metal electrode overpotentials, which enabled the reversible depositing/stripping of magnesium in the PC-based electrolyte, magnesium metal system. It appears that the polymeric coating successfully prevents the reductive magnesium surface from reacting with these solvents.

Further analysis of the structure of these polymeric coatings was conducted with time of flight secondary ion mass spectrometry (TOF-SIMS), which was collected from cPAN-based polymeric coatings with and without $Mg(CF_3SO_3)_2$, which are illustrated in FIGS. 11a-c. A conspicuous signal corresponding to positive ion $Mg^+$, which was generated by the interaction of $Mg^{2+}$ with sputtering ions, appear at m/z=24 only with cPAN with $Mg(CF_3SO_3)_2$, indicating that $Mg(CF_3SO_3)_2$ is the main source of $Mg^+$. Meanwhile, $Mg^+$ was still detected in cPAN containing no $Mg(CF_3SO_3)_2$ due to the magnesium metal underneath the polymeric coating (see FIG. 11a). The negative ions $CF_3SO_3^-$ and $[Mg(CF_3SO_3)_3]^-$ are also most pronounced in intensity in the cPAN-$Mg(CF_3SO_3)_2$ coating. The above observations indicate that magnesium ions are multi-coordinated with $CF_3SO_3^-$ anions and the possible formation of a polymeric network of $CF_3SO_3^-$ and $[Mg(CF_3SO_3)_3]^-$ throughout the cPAN-$Mg(CF_3SO_3)_2$ coating. Therefore, it is speculated that structurally the polymeric coating may contain a cPAN matrix hybridized with a network of multi-coordinated Mg—($CF_3SO_3^-$) units, as illustrated in FIG. 11e. This network facilitates the release of $Mg^{2+}$ from a solvation cage and its diffusion through the coating. Thermogravimetric Analysis (TGA) (see FIG. 11d) compares the thermal stabilities of $Mg(CF_3SO_3)_2$, PAN and PAN-$Mg(CF_3SO_3)_2$ coatings upon heating. While a PAN coating experienced an early and sluggish process of weight loss below 200° C., the thermal decomposition of a $Mg(CF_3SO_3)_2$ coating showed a sudden onset at 400° C., losing ~81 wt % of its original mass in a narrow range of 40° C. A PAN-$Mg(CF_3SO_3)_2$ coating, however, illustrates a unique profile, probably indicating the existence of multi-coordinated Mg—($CF_3SO_3^-$) units in PAN-$Mg(CF_3SO_3)_2$ structure.

The ionic conductivity of a cPAN-$Mg(CF_3SO_3)$, coating was also measured by electrochemical impedance spectroscopy (EIS). The configuration of an example cell 400 is shown in FIG. 12. The ionic conductivity of the $Mg^{2+}$-conducting coating 120 was measured using ion-blocking electrodes (430a and 430b) through electrochemical impedance spectroscopy. In this cell 400, a silver paste 410 was applied to provide intimate contact with the coating 120, and carbon paper was 420 used to avoid direct contact of the two stainless steel ion-blocking electrodes (430a and 430b). FIG. 13a illustrates a typical Nyquist plot along with its corresponding equivalent circuit, obtained for the exemplary cell illustrated in FIG. 12. The Nyquist plot is composed of a semicircle, displaced by the quantity of the bulk resistance of the polymeric coating ($R_b$), whose impedance in a complex plane can be described as the combination of $R_b$, charge-transfer resistance ($R_{ct}$) and the Constant Phase Element (CPE). The ionic conductivity of the $Mg^{2+}$-conducting coating is then derived as:

$$\sigma = \frac{1}{Rb} \times \frac{1}{A} \quad (1)$$

where l is the thickness of the coating and A is the cross-sectional area of the cell. $R_b$ was hence determined by the intercept of the semicircle with real axis of complex impedance plot. The average ionic conductivity of $1.19 \times 10^{-6}$ S cm$^{-1}$ was achieved according to results collected from three independent cells. The electronic conductivity was also detected due to the presence of conjugated sp2 C network formed in the cPAN. Note that the electronic conductivity is only about $1.04 \times 10^{-7}$ S cm$^{-1}$ as plotted in FIG. 13b, which is 10 times less than ionic conductivity. Thus, the possibility of directly depositing onto the polymeric coating will be low. TEM images after deposition confirm that no magnesium deposition can be found on the outer surfaces of the polymeric coating, as indicated in FIG. 14c, which illustrates EDS line scanning results using a TEM (FEI Talos F200X). FIG. 14a illustrates a HAADF TEM image of a $Mg^{2+}$-conducting coating on a magnesium metal electrode. FIG. 14b illustrates EDS mapping results of carbon in the coating. FIG. 14c illustrates EDS mapping results of magnesium in the coating. FIG. 14d illustrates EDS mapping results of fluorine in the coating. FIG. 14e illustrates EDS mapping results of nitrogen in the coating. FIG. 14f illustrates EDS mapping results of sulfur in the coating. FIG. 14g illustrates an HAADF TEM image of $Mg^{2+}$ conducting coating with line scanning area with dashed line. FIG. 14h illustrates EDS line scanning results for magnesium contained in the coating as a function of coating thickness.

These data show that negligible magnesium intensity was observed on the surface of coating and magnesium intensity began to increase in the $Mg^{2+}$-conducting coating. No evidence of magnesium plating on the surface of coating was observed from magnesium intensity variation in line scanning, which confirms the conduction of magnesium through the coating. To the best of our knowledge, this is the first ionic conductivity reported for a coated magnesium metal electrode coated with polymeric cPAN-$Mg(CF_3SO_3)_2$. It is comparable to the ion conductivities known for $Li^+$-polymer electrolytes. Considering that divalent ions are less mobile than their single-valent counterparts due to the much higher Coulombic drag, this ion conductivity is high. Combined with the mechanical strength, the ionically conductive polymeric coating ensures facile $Mg^{2+}$ transport while accommodating the reversible depositing and stripping of magnesium in a magnesium metal electrode.

Figure 15A:
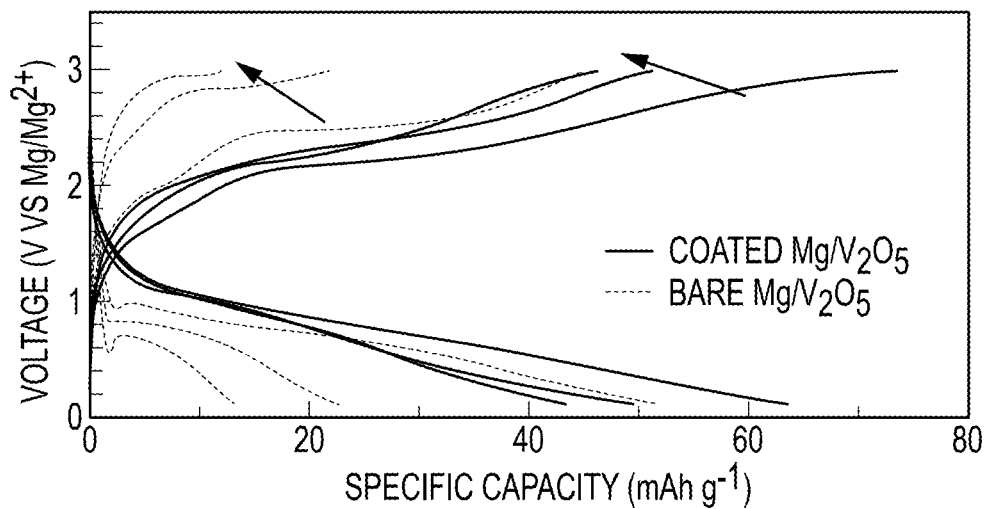
Figure 15B:
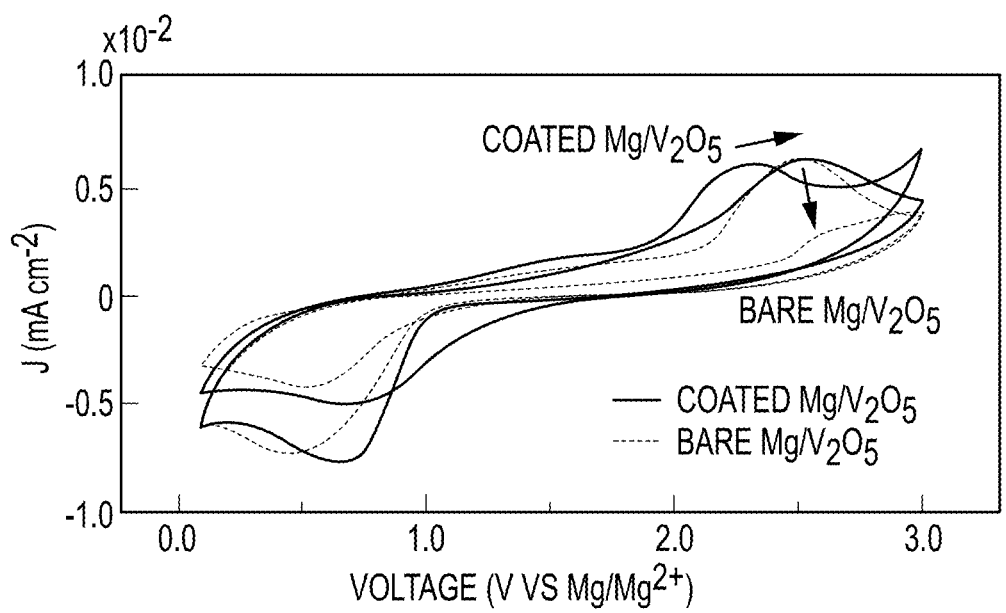
Figure 15C:
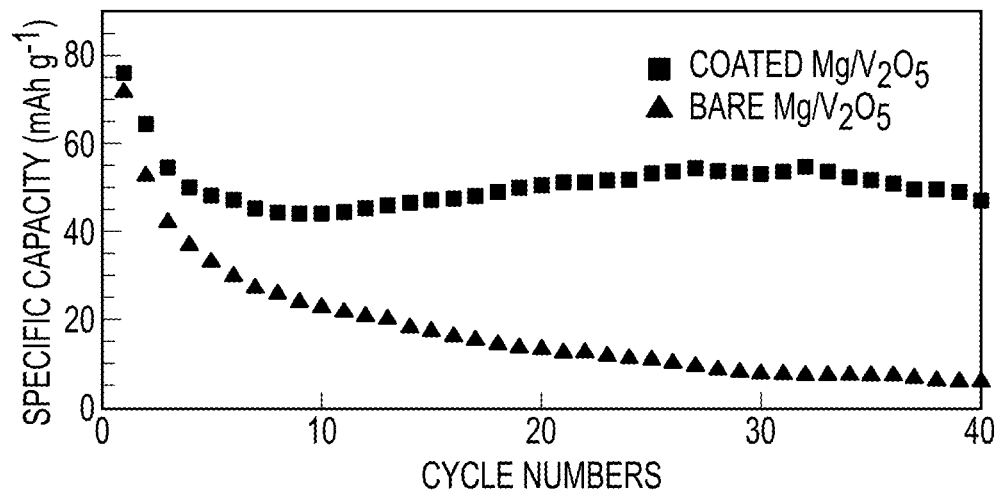
Figure 15D:
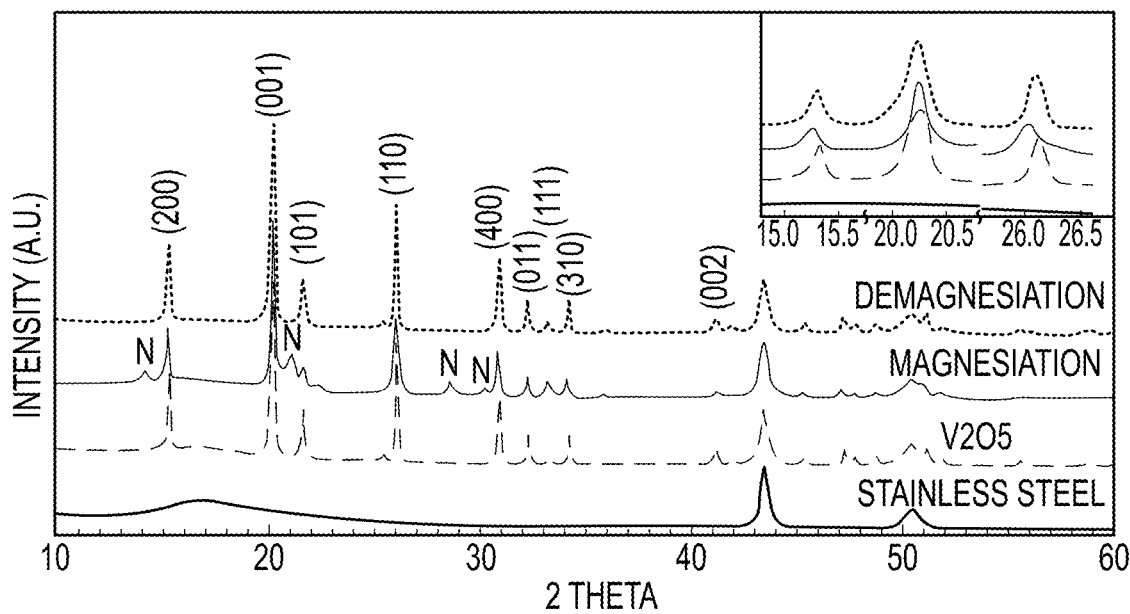

A complete cell was assembled to further prove the concept of a coated magnesium metal electrode using a $Mg^{2+}$-conducting coating. This cell's electrochemical performance results are illustrated in FIGS. 15a-d. FIG. 15a illustrates voltage profiles of cells constructed using an uncoated magnesium metal anode and a $V_2O_5$ cathode, and cells constructed using a coated magnesium metal anode and $V_2O_5$ cathode, for a voltage between 0.01 V and 3 V, and a current density of 29.4 mA g$^{-1}$. Voltage profiles of the $2^{nd}$, $10^{th}$, and $20^{th}$ cycles are presented for both types of cells. The cells utilizing the uncoated magnesium metal anode and the $V_2O_5$ cathode demonstrated rapid capacity losses with cycling, while the cells utilizing the coated magnesium metal anode and the $V_2O_5$ cathode showed stable capacity retention with cycling. FIG. 15b illustrates the CV profiles for the $2^{nd}$ and $30^{th}$ cycles of the uncoated Mg/$V_2O_5$ cell and coated Mg/$V_2O_5$ cell. The scan rate was 0.1 mV S$^{-1}$. FIG. 15c illustrates a cycling performance comparison of the uncoated Mg/$V_2O_5$ cell, versus the coated Mg/$V_2O_5$ cell, both utilizing a 0.5M $Mg(TFSI)_2$ in PC electrolyte. The magnesium metal electrode having a $Mg^{2+}$-conducting coating dramatically improved the cell's cycling stability. FIG. 15d illustrates XRD patterns of pristine $V_2O_5$ sample (that matches the standard structure of orthorhombic $V_2O_5$ based on Joint Committee on Power Diffraction Standards (JCPDS) card No. 41-1426), the Mg intercalated $V_2O_5$ sample (after intercalation of Mg ions into the $V_2O_5$) and the Mg deintercalated $V_2O_5$ sample (after deintercalation of Mg ions from the $V_2O_5$). The inset of FIG. 15d magnifies peaks of (200) and (110) that shift to lower two theta degrees when intercalated and recover after deintercalation. Peaks newly appeared after intercalation are denoted as N and are diminished after deintercalation.

An orthorhombic $V_2O_5$ cathode, which can reversibly intercalate $Mg^{2+}$, was coupled with a magnesium metal anode with and without a coating, and the cells were galvanostatically cycled at a rate of 29.4 mA g$^{-1}$. 0.5M $Mg(TFSI)_2$ in PC was used as the electrolyte. As displayed in FIGS. 15a and 15b, the cell made with a $V_2O_5$ cathode and a coated magnesium metal anode demonstrated significant improvement in terms of the operating voltage and discharge capacity. Thus, sustainable cycling performance was achieved in a carbonate-based electrolyte. In comparison, the cell made with a $V_2O_5$ cathode and an uncoated magnesium metal (e.g. in the absence of a coating) resulted in rapid capacity fading accompanied by a sharp rise in overpotential as shown in FIG. 15c. During the first discharge (magnesium intercalation into a $V_2O_5$ cathode), both cells delivered ~70 mAh g$^{-1}$, (71 mAh g$^{-1}$ for the cell with an uncoated magnesium metal anode and 76 mAh g$^{-1}$ for the cell with a coated magnesium metal anode), which corresponds to about ~0.24 moles of magnesium ions intercalated per mole of $V_2O_5$ cathode. The severe capacity decay observed in the cell with an uncoated magnesium metal anode was apparently caused by the formation of a passivation layer on the surface(s) of the uncoated magnesium metal anode, resulting in the inhibition of $Mg^{2+}$ transfer and the reversible deposition of magnesium in the magnesium metal electrode. On the other hand, a sustainable cycling performance was obtained in the cell having a coated magnesium metal anode. XRD measurements provide structural evidence for the reversible intercalation/deintercalation chemistry of $Mg^{2+}$ ion in the lattice of $V_2O_5$, where the main (200) and (110) peaks are shifted to the lower 2-θ values after initial intercalation of magnesium ions and recovered to their original positions after deintercalation releasing magnesium ions (see FIG. 15d).

FIG. 16 illustrates a battery 500 that includes an anode 510 and a cathode 520, with an electrolyte 130 positioned between the anode 510 and the cathode 520. In this embodiment, the battery 500 is a symmetric battery, where the anode 510 and the cathode 520 are substantially identical, with each having a current collector (140a and 140b), a coating (120a and 120b), with a magnesium metal (110a and 110b) foil positioned between the current collector (140a and 140b) and the coating (120a and 120b). FIG. 16 also shows electrically connecting the cathode 520 to the anode 510 via a circuit 530. In the example shown in FIG. 16, the battery is "charging". Thus, electrons are shown as flowing from the cathode 520 to the anode 510 and with $Mg^{2+}$ ions flow from the cathode's magnesium layer 110b, through a separator positioned in the electrolyte 130, to the anode's magnesium layer 110a. The opposite occurs when "discharging" the battery: electrons flowing from the anode 510 to the cathode 520 and $Mg^{2+}$ ions flow from the anode's magnesium layer 110a, through the separator positioned in the electrolyte 130, to the cathode's magnesium layer 110b.

Although FIG. 16 illustrates a symmetric battery 500, other batteries may be envisioned, that utilize only one magnesium-containing electrode. For example, in some embodiments, the battery 500 may include a magnesium-containing anode 510 (as shown in FIG. 16), however, include a non-magnesium-containing cathode. For example, in some embodiments a cathode may include at least one of $V_2O_5$, $MoO_3$, $MnO_2$, $TiO_2$, $TiS_2$, and/or sulfur. A separator 540 may be constructed of glass, polypropylene, polyethylene, and/or any other suitable $Mg^{2+}$-permeable material. In some embodiments of the present disclosure, the electrolyte 130 positioned between the cathode 520 and the anode 510 may be a solid that is $Mg^{2+}$-permeable. For example, a solid electrolyte 130 may be constructed of at least one of polyacrylonitrile (PAN), a cyclized polyacrylonitrile (cPAN), a polyimide, a polyamide, a polystyrene, a polyethylene, a polyether, poly(3,4-ethylenedioxythiophene), a polypyrrole, a polythiophene, a polyaniline, a polyacetylene, a polyparaphenylene, a polyethylene oxide, and/or a polyethylene glycol. In such an embodiment, the solid electrolyte replaces the liquid electrolyte and is in physical contact with the magnesium metal 110a of the anode 510 and the magnesium metal 110b of the cathode 520. Alternatively, if the solid electrolyte is constructed of a material that is different than the material used to construct the coating 120a of the anode 510 and/or the material used to construct the coating 120b of the cathode 520, the solid electrolyte may be in physical contact with both coatings (120a and 120b)). Such embodiments may be suitable for use in solid-state batteries, such as coin batteries.

FIG. 17 illustrates a method for charging and/or discharging a symmetric magnesium metal-containing battery. The method 600 includes converting 610 elemental magnesium from a first magnesium metal-containing electrode to $Mg^{2+}$ ions. The method 600 continues with transferring 620 the $Mg^{2+}$ ions through a first coating positioned on the outside surface of the first magnesium metal-containing electrode. Next, the method 600 proceeds with transferring 630 the $Mg^{2+}$ ions through an electrolyte. Next, the method 600 proceeds with transferring 640 the $Mg^{2+}$ ions through a second coating positioned on a second magnesium metal-containing electrode. Finally, the method 600 concludes with converting 650 at least a portion of the transferred $Mg^{2+}$ ions to elemental magnesium on the surface of the second magnesium metal-containing electrode. For example, if the steps described above were completed during charging of the battery, the reverse process would occur in a subsequent discharging step.

Fabrication of magnesium metal electrodes. Coated magnesium metal electrodes were constructed using magnesium powder (Alfa Aesar, −325 mesh), carbon black, PAN and $Mg(CF_3SO_3)_2$ in weight ratio of 77%-10%-10%-3%. Prepared mixture was dissolved in dimethylformamide (DAF) solution and then stirred for 5 hours. The achieved slurry was coated on stainless steel foil and then heat-treated at 300° C. for 1 hour under argon to convert the PAN to cPAN in the electrode. Bare magnesium metal electrodes were constructed of 80% of magnesium, 10% of carbon black (CB), and 10% of polyvinylidene fluoride (PVDF) binder. A predetermined amount of N-methylpyrrolidone (NMP, Sigma Aldrich) was added and the resultant slurry was thoroughly mixed. An applicator was used to blade the slurry onto a stainless steel current collector, after which the slurry was heated to remove residual liquid. The processes for fabrication of magnesium metal electrodes were conducted in the glove box filled with argon.

Electrochemical test. Coin cells with 2032 type were used for cyclic voltammetry and galvanostatic cycling measurements. Biologic and Arbin were used for both cyclic voltammetry and galvanostatic cycling measurements.

Preparation of $V_2O_5$ electrode. A $V_2O_5$ cathode was prepared by using micro-sized particles, purchased from Aldrich. Three grams of $V_2O_5$ powders (Alfa Aesar) were ball-milled for 50 hours and then heat-treated at 650° C. for 5 minutes before mixing with the electrode additives. The $V_2O_5$ electrodes used here were comprised of 70% of $V_2O_5$, 15% of CB, and 15% of PVDF binder.

Microstructure and XRD analysis. A FIB (FEI, NOVA200 dual beam system) was used for TEM sample preparation and Pt deposition was applied to protect the surface of desired observation area. The Pt deposition was applied with electron beam first to minimize the damage on the coating layer and then Pt deposition with $Ga^+$ ion was applied. Ga ion source was used for FIB sectioning. The microstructure of $Mg^{2+}$-conducting coating structure was investigated by analytical TEM (TECNAI F20 and FEI Talos F200X equipped with EDS) operating at 200 keV. XRD data for phase determination was collected with X-ray diffractometer (XRD, Rigaku DMax) with Cu—Kα radiation.

Secondary Ion Mass Spectrometry (SIMS) measurement. An ION-TOE TOF-SIMS V spectrometer was utilized to determine the composition of the specimens. Surface spectra were acquired utilizing a $Bi^{3+}$ primary-ion beam (operated in bunched mode; 21 ns pulse width, analysis current 0.6 pA), scanned over a 50×50 μm area, utilizing a low energy electron flood gun for charge-compensation. A 150 μs cycle time was utilized, yielding mass spectra with a range of 1 to 2,000 amu. All spectra were collected at a primary ion dose density of $1 \times 10^{22}$ ions $cm^{-2}$ to remain under the static-SIMS limit.

XPS measurement. Samples were transferred without air exposure to an $N_2$ atmosphere glove box connected to the XPS system. XPS experiments were performed using a Physical Electronics (PHI) 5600 photoelectron spectrometer. Excitation was provided with a monochromatized Al anode (Kα radiation at 1486.6 eV) operating at 25 mA and 15 kV. Core level spectra were collected at analyzer pass energy of 11.75 eV. The XPS binding energies were calibrated by comparing centroid positions of clean Cu $2p_{3/2}$, Ag $3d_{5/2}$, and Au $4f_{7/2}$ from measured and accepted values. The spectra were fit and analyzed in Multipak software. No charging of the samples was observed.

TGA analysis. TGA was performed using a TA Instruments SDT Q600 Simultaneous TGA/DSC system. 5 mg of the sample was placed in a platinum crucible and then into the TGA/DSC for analysis. The sample was heated to 500° C. under nitrogen flow at a ramping rate of 1° C. per minute.

Conductivity measurement. The ionic conductivity of the $Mg^{2+}$-conducting coating was measured using ion-blocking electrodes through electrochemical impedance spectroscopy. To ensure good electrical contact a silver paste or a conductive carbon tape was first coated on top of the polymer. For the example illustrated in FIG. 12, a $Mg^{2+}$-conducting coating 120 was applied to magnesium metal 110, which was sandwiched between two stainless steel disks, which performed as the ion blocking electrodes (100a and 100b). Silver paste 410 was used to enhance the electronic contact between the $Mg^{2+}$-conducting coating 120 and the first stainless steel electrode 100a. EIS was conducted on this set-up with AC amplitude of 50 mV and frequency of $10^6$-0.01 Hz. The obtained results were plotted on a Nyquist diagram and the high frequency intercept with the real axis was used as the ionic resistance of the polymer electrolyte.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

Example 1

A device that includes a first electrode, where the first electrode includes magnesium metal having a first surface, and a first coating in physical contact with the first surface and covering substantially all of the first surface, where the first coating has a first thickness, and the first coating is configured to transport a plurality of magnesium ions through the first thickness, such that a first portion of the plurality of magnesium ions are reversibly depositable as elemental magnesium onto the first surface.

Example 2

The device of Example 1, where the magnesium metal may be in the form of a particle, a film, a foil, a pellet, a cylinder, and/or a sphere.

Example 3

The device of Examples 1 or 2, where the first coating may include a first polymer.

Example 4

The device of Example 3, where the first polymer may include at least one of a polyacrylonitrile (PAN), a cyclized polyacrylonitrile (cPAN), a polyimide, a polyamide, a polystyrene, a polyethylene, a polyether, poly(3,4-ethylenedioxythiophene), a polypyrrole, a polythiophene, a polyaniline, a polyacetylene, a polyparaphenylene, a polyethylene oxide, and/or a polyethylene glycol.

Example 5

The device of Examples 3 or 4, where the first polymer may be cPAN.

Example 6

The device of any one of Examples 1-5, where the first coating may further include a magnesium-ion salt.

Example 7

The device of Example 6, where the magnesium-ion salt may include at least one of $MgClO_4$, $Mg(PF_6)_2$, $Mg(CF_3SO_3)_2$, $MgCO_3$, $Mg(BF4)_2$, $Mg(NO_3)_2$, and/or magnesium(II) bis(trifluoromethane sulfonyl) imide $(Mg(TFSI)_2)$.

Example 8

The device of any one of Examples 1-7, where the first coating may have a thickness between about 1 nm and about 500 nm.

Example 9

The device of any one of Examples 1-8, where the device may further include an electrolyte, where the electrolyte may be in physical contact with the first coating.

Example 10

The device of Example 9, where the electrolyte may include at least one of a nitrite and/or a carbonate.

Example 11

The device of Example 10, where the electrolyte may include at least one of acetonitrile and/or propylene carbonate.

Example 12

The device of any one of Examples 9-11, where the electrolyte may further include a magnesium-ion salt.

Example 13

The device of Example 12, where the magnesium-ion salt may include at least one of $MgClO_4$, $Mg(PF_6)_2$, $Mg(CF_3SO_3)_2$, $MgCO_3$, $Mg(BF4)_2$, $Mg(NO_3)_2$, and/or magnesium(II) bis(trifluoromethane sulfonyl) imide $(Mg(TFSI)_2)$.

Example 14

The device of any one of Examples 1-13, where the first portion may be between about 80% and about 100% of the plurality of magnesium ions.

Example 15

The device of any one of Examples 1-14, where the first electrode may further include a first current collector, the first current collector may be in contact with the magnesium metal, and the magnesium metal may be positioned between the first current collector and the first coating.

Example 16

The device of any one of Examples 9-15, where the device may further include a second electrode including $V_2O_5$, where a second portion of the plurality of magnesium ions may be reversibly intercalateable in the $V_2O_5$, and the second electrode may be in physical contact with the electrolyte.

Example 17

The device of any one of Examples 9-15, where the device may further include a second electrode including magnesium metal having a second surface, and a second coating in physical contact with the second surface and covering substantially all of the second surface, where the second coating has a second thickness, and the second coating may be configured to transport a third portion of the plurality of magnesium ions through the second thickness, such that a fourth portion of the plurality of magnesium ions may be reversibly depositable as elemental magnesium onto the second surface.

Example 18

The device of Example 17, where the magnesium metal of the second electrode may be in the form of a particle, a film, a foil, a pellet, a cylinder, and/or a sphere.

Example 19

The device of Examples 17 or 18, where the second coating may include a second polymer.

Example 20

The device of Example 19, where the second polymer may include at least one of a polyacrylonitrile (PAN), a cyclic polyacrylonitrile (cPAN), a polyimide, a polyamide, a polystyrene, a polyethylene, a polyether, poly(3,4-ethylenedioxythiophene), a polypyrrole, a polythiophene, a polyaniline, a polyacetylene, a polyparaphenylene, a polyethylene oxide, and/or a polyethylene glycol.

Example 21

The device of Exam 9 or 20, where the second polymer may include cPAN.

Example 22

The device of any one of Examples 17-21, where the second coating may include a magnesium-ion salt.

Example 23

The device of Example 22, where the magnesium-ion salt of the second coating may include at least one of $MgClO_4$, $Mg(PF_6)_2$, $Mg(CF_2SO_3)_2$, $MgCO_3$, and/or magnesium(II) bis(trifluoromethane sulfonyl) imide ($Mg(TFSI)_2$).

Example 24

The device of any one of Examples 17-23, where the second coating may have a thickness between about 1 nm and about 500 nm.

Example 25

The device of any one of Examples 17-24, where the electrolyte may be in physical contact with the second coating.

Example 26

The device of any one of Examples 17-25, where the electrolyte may include at least one of a nitrile and/or a carbonate.

Example 27

The device of any one of Examples 17-26, where the fourth portion may be between about 80% and about 100% of the plurality of magnesium ions.

Example 28

The device of Example 17, where the electrolyte may include a third polymer, and the third polymer may be in physical contact with the first coating and the second coating.

Example 29

The device of any one of Examples 17-28, where the second electrode may further include a second current collector, the second current collector may be in contact with the magnesium metal of the second electrode, and the magnesium metal of the second electrode may be positioned between the second current collector and the second coating.

Example 30

An electrode including magnesium metal including a surface, and a coating in physical contact with the surface and covering substantially all of the surface, where the coating has a thickness, and the coating is configured to transport a plurality of magnesium ions through the thickness, such that a portion of the plurality of magnesium ions are reversibly depositable as elemental magnesium onto the surface.

Example 31

The electrode of Example 30, where the magnesium metal may be in the form of a particle, a film, a foil, a pellet, a cylinder, and/or a sphere.

Example 32

The electrode of Example 30 or 31, where the coating may include a polymer.

Example 33

The electrode of claim 32, where the polymer may include at least one of a polyacrylonitrile (PAN), a cyclized polyacrylonitrile (cPAN), a polyimide, a polyamide, a polystyrene, a polyethylene, a polyether, poly(3,4-ethylenedioxythiophene), a polypyrrole, a polythiophene, a polyaniline, a polyacetylene, a polyparaphenylene, a polyethylene oxide, and/or a polyethylene glycol.

Example 34

The electrode of Examples 32 or 33, where the polymer y be cPAN.

Example 35

The electrode of any one of Examples 31-33, where the polymer may further include a magnesium-ion salt.

Example 36

The device of Example 35, where the magnesium-ion salt may include at least one of $MgClO_4$, $Mg(PF_6)_2$, $Mg(CF_3SO_3)_2$, $MgCO_3$, $Mg(BF4)_2$, $Mg(NO_3)_2$, and/or magnesium(II) bis(trifluoromethane sulfonyl) imide ($Mg(TFSI)_2$).

Example 37

The electrode of any one of Examples 30-36, where the coating may have a thickness between about 1 nm and about 500 nm.

Example 38

A method for charging and discharging a battery, the method including, in a first electrode having a magnesium metal, converting a first portion of the first magnesium metal to a first plurality of $Mg^{2+}$ ions, transferring a first portion of the first plurality of $Mg^{2+}$ ions through a first coating substantially covering the magnesium metal, transferring the first portion of the first plurality of $Mg^{2+}$ ions through an electrolyte in physical contact with the first coating, transferring first portion of the first plurality of $Mg^{2+}$ ions through a second coating substantially covering a magnesium metal of a second electrode, and converting the first portion of the first plurality of $Mg^{2+}$ ions to elemental magnesium on the magnesium metal of the second electrode, where the second coating is in physical contact with the electrolyte.

Example 39

The method of Example 38, further including converting the elemental magnesium on the magnesium metal of the second electrode to a second plurality of $Mg^{2+}$ ions, transferring the second plurality of $Mg^{2+}$ ions through the second coating, transferring the second plurality of $Mg^{2+}$ ions through the electrolyte, transferring second plurality of $Mg^{2+}$ ions through the first coating, converting the second plurality of $Mg^{2+}$ ions to elemental magnesium on the magnesium metal of the first electrode.

What is claimed is:

1. A device comprising:
   a first electrode comprising:
   magnesium metal comprising a surface;
   a current collector in physical contact with the magnesium metal; and
   a coating, wherein:
   the magnesium metal is positioned between the current collector and the coating,
   the coating comprises a polymer and a magnesium-ion salt,
   the coating is in physical contact with the surface and covers substantially all of the surface, and
   the coating is configured such that a first portion of a plurality of magnesium ions may be reversibly transported through the coating and reversibly deposited as elemental magnesium onto the surface.

2. The device of claim 1, wherein the magnesium metal is in the form of a particle, a film, a foil, a pellet, a cylinder, or a sphere.

3. The device of claim 1, wherein the polymer comprises a polyacrylonitrile (PAN), a cyclized polyacrylonitrile (cPAN), a polyimide, a polyamide, a polystyrene, a polyethylene, a polyether, a polypyrrole, a polythiophene, a polyaniline, a polyacetylene, a polyparaphenylene, a polyethylene oxide, a polyethylene glycol, or a mixture thereof.

4. The device of claim 3, wherein the polymer is cPAN.

5. The device of claim 1, wherein the magnesium-ion salt comprises $MgClO_4$, $Mg(PF_6)_2$, $Mg(CF_3SO_3)_2$, $MgCO_3$, $Mg(BF4)_2$, $Mg(NO_3)_2$, magnesium(II) bis(trifluoromethane sulfonyl) imide ($Mg(TFSI)_2$), or a mixture thereof.

6. The device of claim 1, wherein the coating has a thickness between about 1 nm and about 500 nm.

7. The device of claim 1, further comprising an electrolyte, wherein the electrolyte is in physical contact with the coating.

8. The device of claim 7, wherein the electrolyte comprises a nitrile, a carbonate, or a mixture thereof.

9. The device of claim 8, wherein the electrolyte comprises acetonitrile, propylene carbonate, or a mixture thereof.

10. The device of claim 7, wherein the electrolyte further comprises a magnesium-ion salt.

11. The device of claim 10, wherein the magnesium-ion salt of the electrolyte comprises $MgClO_4$, $Mg(PF_6)_2$, $Mg(CF_3SO_3)_2$, $MgCO_3$, $Mg(BF4)_2$, $Mg(NO_3)_2$, magnesium (II) bis(trifluoromethane sulfonyl) imide ($Mg(TFSI)_2$), or a mixture thereof.

12. The device of claim 7, further comprising:
   a second electrode comprising $V_2O_5$, wherein:
   a second portion of the plurality of magnesium ions are reversibly intercalated in the $V_2O_5$, and
   the second electrode is in physical contact with the electrolyte.

13. The device of claim 1, wherein the first portion is between about 80% and about 100% of the plurality of magnesium ions.

14. An electrode comprising:
   magnesium metal comprising a surface;
   a current collector in physical contact with the magnesium metal; and
   a coating, wherein:
   the magnesium metal is positioned between the current collector and the coating,
   the coating comprises a polymer and a magnesium-ion salt,
   the coating is in physical contact with the surface and covers substantially all of the surface, and
   the coating is configured such that a plurality of magnesium ions may be reversibly transported through the coating and reversibly deposited as elemental magnesium onto the surface.

15. A method for charging and discharging a battery, the method comprising:
   in a first electrode comprising a magnesium metal, reversibly converting a portion of the magnesium metal to a first plurality of $Mg^{2+}$ ions;
   reversibly transferring a portion of the first plurality of $Mg^{2+}$ ions through a first coating comprising a polymer and a magnesium-ion salt where the first coating substantially covers the magnesium metal;
   transferring the portion of the first plurality of $Mg^{2+}$ ions through an electrolyte in physical contact with the first coating;
   transferring the portion of the first plurality of $Mg^{2+}$ ions through a second coating substantially covering a second electrode; and
   intercalating the portion of the first plurality of $Mg^{2+}$ ions into the second electrode, wherein:
   the second coating is in physical contact with the electrolyte,
   the magnesium metal is in physical contact with a current collector, and
   the magnesium metal is positioned between the current collector and the coating.

16. The method of claim 15, further comprising:
deintercalating a second plurality of $Mg^{2+}$ ions from the second electrode;
transferring the second plurality of $Mg^{2+}$ ions through the second coating;
transferring the second plurality of $Mg^{2+}$ ions through the electrolyte;
reversibly transferring second plurality of $Mg^{2+}$ ions through the first coating;
reversibly converting the second plurality of $Mg^{2+}$ ions to elemental magnesium on the magnesium metal of the first electrode.

* * * * *